US011235510B2

(12) United States Patent
Han et al.

(10) Patent No.: US 11,235,510 B2
(45) Date of Patent: Feb. 1, 2022

(54) PROTECTIVE FILM PEELING APPARATUS AND METHOD OF PEELING A PROTECTIVE FILM USING THE SAME

(71) Applicant: Samsung Display Co., Ltd., Yongin-Si (KR)

(72) Inventors: Gyeonghee Han, Gwangmyeong-si (KR); Jekil Ryu, Yongin-si (KR); Yoongyeong Bae, Goyang-si (KR); Jooseob Ahn, Hwaseong-si (KR); Seongchae Jeong, Suwon-si (KR); Inae Han, Suwon-si (KR); Gyoowan Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/077,561

(22) Filed: Oct. 22, 2020

(65) Prior Publication Data

US 2021/0039304 A1 Feb. 11, 2021

Related U.S. Application Data

(62) Division of application No. 16/035,978, filed on Jul. 16, 2018, now Pat. No. 10,843,400.

(30) Foreign Application Priority Data

Oct. 13, 2017 (KR) .................... 10-2017-0133548

(51) Int. Cl.
*B32B 43/00* (2006.01)
*B29C 63/00* (2006.01)
(Continued)

(52) U.S. Cl.
CPC ........ *B29C 63/0013* (2013.01); *B32B 43/006* (2013.01); *B65H 29/54* (2013.01);
(Continued)

(58) Field of Classification Search
CPC . B32B 38/10; B32B 43/006; Y10T 156/1168; Y10T 156/1978
See application file for complete search history.

(56) References Cited

U.S. PATENT DOCUMENTS 6,149,758 A    11/2000  Tsujimoto et al.
7,823,619 B2   11/2010  Yoshizawa et al.
(Continued)

FOREIGN PATENT DOCUMENTS

JP    2010001104 A    1/2010
KR    101277046 B1    6/2013
(Continued)

*Primary Examiner* — Mark A Osele
*Assistant Examiner* — Nickolas R Harm
(74) *Attorney, Agent, or Firm* — Cantor Colburn LLP

(57) ABSTRACT

A protective film peeling apparatus includes a peeling tape, a tape support portion disposed under one side of the peeling tape, a first pressing portion which is disposed on the one side of the peeling and fixes the one side of the peeling tape to the tape support portion, a second pressing portion which is disposed on another side of the peeling tape and presses and attaches the another side of the peeling tape to one side of a dummy portion of a protective film on a panel, and a grip portion disposed on the dummy portion. The tape support portion and the first pressing portion peel the one side of the dummy portion and a predetermined portion of the dummy portion, and the grip portion peel a remaining portion of the dummy portion.

10 Claims, 26 Drawing Sheets

(51) Int. Cl.
*B65H 41/00* (2006.01)
*B65H 29/54* (2006.01)
*G02F 1/13* (2006.01)
*B32B 38/10* (2006.01)

(52) U.S. Cl.
CPC .............. *B65H 41/00* (2013.01); *B32B 38/10* (2013.01); *B32B 2457/20* (2013.01); *B65H 2801/61* (2013.01); *G02F 1/1303* (2013.01); *Y10T 156/1168* (2015.01); *Y10T 156/1978* (2015.01)

(56) References Cited

U.S. PATENT DOCUMENTS

| | | |
|---|---|---|
| 2008/0011420 A1 | 1/2008 | Yoshizawa et al. |
| 2011/0155328 A1 | 6/2011 | Kobayashi et al. |
| 2014/0020844 A1 | 1/2014 | Woo et al. |
| 2017/0158449 A1 | 6/2017 | Kramer |

FOREIGN PATENT DOCUMENTS

| | | |
|---|---|---|
| KR | 1020140007553 A | 1/2014 |
| KR | 1020140011217 A | 1/2014 |
| KR | 101612076 B1 | 4/2016 |
| WO | 2006003816 A1 | 1/2006 |

PROTECTIVE FILM PEELING APPARATUS AND METHOD OF PEELING A PROTECTIVE FILM USING THE SAME

This application is a divisional of U.S. patent application Ser. No. 16/035,978, filed on Jul. 16, 2018, which claims priority to Korean Patent Application No. 10-2017-0133548, filed on Oct. 13, 2017, and all the benefits accruing therefrom under 35 U.S.C. § 119, the content of which in its entirety is herein incorporated by reference.

BACKGROUND

1. Field

Exemplary embodiments of the invention relate to a protective film peeling apparatus and a method of peeling a protective film using the same. More particularly, exemplary embodiments of the invention relate to a protective film peeling apparatus capable of easily peeling a protective film of a mother panel and a method of peeling a protective film using the same.

2. Description of the Related Art

Display devices, e.g., a monitor, iPad, a smart phone, and a tablet personal computer ("PC") providing images to users may generally include display panels displaying images. The display panels may include various types of panels such as a liquid crystal display panel, an organic light emitting display panel, an electrowetting display panel, and an electrophoretic display panel.

Recently, display devices having flexible display panels and stretchable display panels have been developed with a technology development of the display devices. The flexible display panels may be foldable or rollable, and the stretchable display panels may be stretchable in at least one direction. These display devices may be modified in predetermined forms or may be modified in various forms by users. The display devices including the flexible display panels may further include a protective film which is disposed under the flexible display panels to protect a lower portion of the flexible display panels.

SUMMARY

Exemplary embodiments of the invention may provide a protective film peeling apparatus capable of easily peeling a protective film of a mother panel and a method of peeling a protective film using the same.

In an exemplary embodiment of the invention, a protective film peeling apparatus may include a peeling tape extending in a first direction, a tape support portion disposed under one side of the peeling tape, a first pressing portion disposed on the one side of the peeling tape and moving in a downward direction to press and fix the one side of the peeling tape to the tape support portion, a second pressing portion disposed on another side of the peeling tape and pressing the another side of the peeling tape to one side of a dummy portion of a protective film on a panel to attach the another side of the peeling tape to the one side of the dummy portion, and a grip portion disposed on the dummy portion. The tape support portion and the first pressing portion may move in an upward direction to peel the one side of the dummy portion and a predetermined portion of the dummy portion, and the grip portion may grip the peeled predetermined portion of the dummy portion to peel a remaining portion of the dummy portion.

In an exemplary embodiment of the invention, a method of peeling a protective film may include disposing one side of a peeling tape extending in a first direction on a tape support portion, moving a first pressing portion disposed on the one side of the peeling tape in a downward direction to press and fix the one side of the peeling tape to the tape support portion, moving a second pressing portion disposed on another side of the peeling tape in the downward direction to press and attach the another side of the peeling tape to one side of a dummy portion of a protective film of a mother panel, moving the second pressing portion in an upward direction and moving the tape support portion and the first pressing portion in the upward direction to peel the one side of the dummy portion and a predetermined portion of the dummy portion, and peeling a remaining portion of the dummy portion by gripping the peeled predetermined portion of the dummy portion with a grip portion.

In an exemplary embodiment of the invention, a protective film peeling apparatus may include a peeling tape supply portion supplying a peeling tape extending in a first direction, a first guide portion and a second guide portion disposed under the peeling tape supply portion, a first guide roller and a second guide roller disposed under the first guide portion and the second guide portion, respectively, and supplied with the peeling tape to move the peeling tape in the first direction, a pressing portion disposed between the first and second guide portions and moving in a downward direction to press and attach the peeling tape between the first and second guide rollers to one side of a dummy portion of a protective film on a panel, and a grip portion disposed adjacent to the first and second guide portions. The first and second guide rollers and the pressing portion may move in an upward direction to peel the one side of the dummy portion and a predetermined portion of the dummy portion, and the grip portion may move in the downward direction to grip the peeled predetermined portion of the dummy portion and peels a remaining portion of the dummy portion.

In an exemplary embodiment of the invention, a method of peeling a protective film may include providing a peeling tape extending in a first direction to a first guide roller and a second guide roller which rotate, stopping the rotation of the first and second guide rollers and moving a pressing portion in a downward direction to press and attach the peeling tape between the first and second guide rollers to one side of a dummy portion of a protective film on a panel, moving the first and second guide rollers and the pressing portion in an upward direction to peel the one side of the dummy portion and a predetermined portion of the dummy portion, and moving a grip portion in the downward direction and gripping the peeled predetermined portion of the dummy portion with the grip portion to peel a remaining portion of the dummy portion.

BRIEF DESCRIPTION OF THE DRAWINGS

The above and other exemplary embodiments and features of the invention will become more apparent by describing in further detail exemplary embodiments thereof with reference to the accompanying drawings, in which.

DETAILED DESCRIPTION

Figure 1:
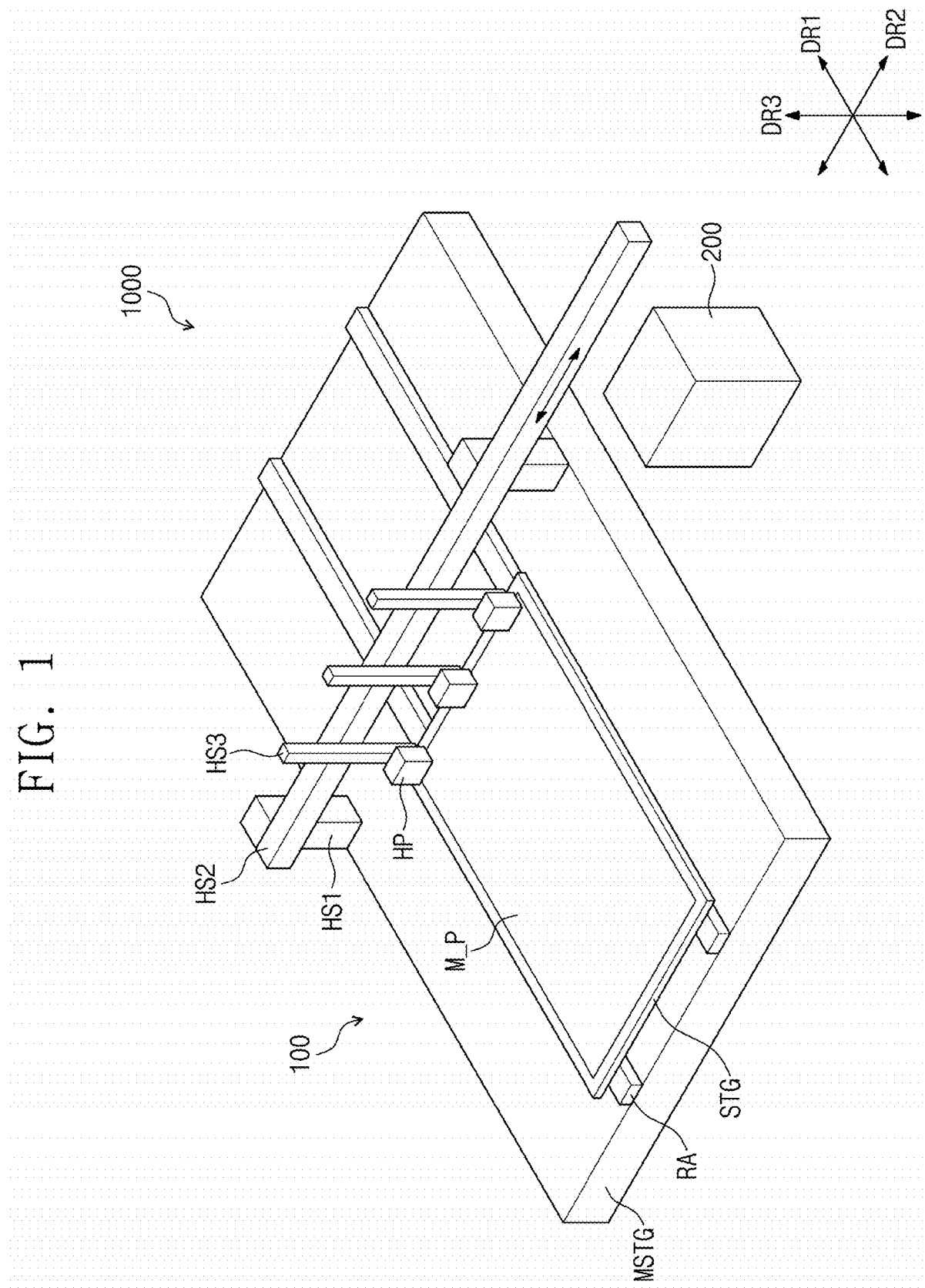
FIG. 1 is a schematic perspective view illustrating an exemplary embodiment of a protective film peeling apparatus according to the invention.

The invention now will be described more fully hereinafter with reference to the accompanying drawings, in which various exemplary embodiments are shown. This invention may, however, be embodied in many different forms, and should not be construed as limited to the exemplary embodiments set forth herein. Rather, these exemplary embodiments are provided so that this invention will be thorough and complete, and will fully convey the scope of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the drawing figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

FIG. 1 is a schematic perspective view illustrating a protective film peeling apparatus according to an exemplary embodiment of the invention.

Referring to FIG. 1, a peeling apparatus 1000 according to an exemplary embodiment of the invention may include a peeling portion 100 and a peeling tape supply portion 200. The peeling portion 100 may include a main stage MSTG, two rail portions RA, a stage STG, two first head support portions HS1, a second head support portion HS2, a plurality of third head support portions HS3, and a plurality of head portions HP.

The rail portions RA may be disposed on the main stage MSTG and may extend in a first direction DR1. The two rail portions are illustrated as an example in FIG. 1. However, the invention is not limited thereto. In some exemplary embodiments, three or more rail portions RA may be disposed on the main stage MSTG.

The stage STG may be disposed on the rail portions RA, and a mother panel M_P may be disposed on the stage STG. The mother panel M_P may be placed on the stage STG, and the stage STG may move along the rail portions RA in the first direction DR1. The first direction DR1 may be opposite directions and may include a left direction and a right direction. In an exemplary embodiment, the stage STG may move in the right direction of the first direction DR1, for example.

The first head support portions HS1 may be arranged in a second direction DR2 intersecting the first direction DR1 and may be respectively disposed on both edge portions of the main stage MSTG with the rail portions RA interposed therebetween. The first head support portions HS1 may extend in a third direction DR3 intersecting a plane parallel to the first and second directions DR1 and DR2. Each of the second and third directions DR2 and DR3 may be opposite directions. The third direction DR3 may include an upward direction and a downward direction.

The second head support portion HS2 may be connected to top ends of the first head support portions HS1 and may extend in the second direction DR2. A length of the second head support portion HS2 in the second direction DR2 may be greater than a length of the main stage MSTG in the second direction DR2. Thus, one side of the second head support portion HS2 may be disposed outside the main stage MSTG.

The third head support portions HS3 extending in the third direction DR3 may be provided on the second head support portion HS2, and the head portions HP may be provided on lower portions of the third head support portions HS3. Three third head support portions HS3 and three head portions HP are illustrated as an example in FIG. 1. However, the numbers of the third head support portions HS3 and the head portions HP are not limited thereto. In other exemplary embodiments, one head portion HP and one third head support portion HS3 may be provided in the peeling portion 100, or two or four or more head portions HP and two or four or more third head support portions HS3 may be provided in the peeling portion 100.

The third head support portions HS3 may reciprocate along the second head support portion HS2 in the second direction DR2. The head portions HP connected to the third head support portions HS3 may also reciprocate in the second direction DR2.

The third head support portions HS3 may move in the second direction DR2 beyond the main stage MSTG to move the head portions HP closer to the peeling tape supply portion 200. The head portions HP may be supplied with peeling tapes from the peeling tape supply portion 200. The peeling tape supply portion 200 and the peeling tapes will be described later in more detail.

After the head portions HP are supplied with the peeling tapes, the third head support portions HS3 may move in the second direction DR2 to move the head portions HP onto the main stage MSTG. The head portions HP may peel dummy portions of a protective film of the mother panel M_P by the peeling tapes. The feature and operation will be described later in more detail. Even though not shown in the drawings, an image sensing portion for checking a position of the mother panel M_P disposed on the stage STG may be provided at each of the head portions HP.

Figure 2:
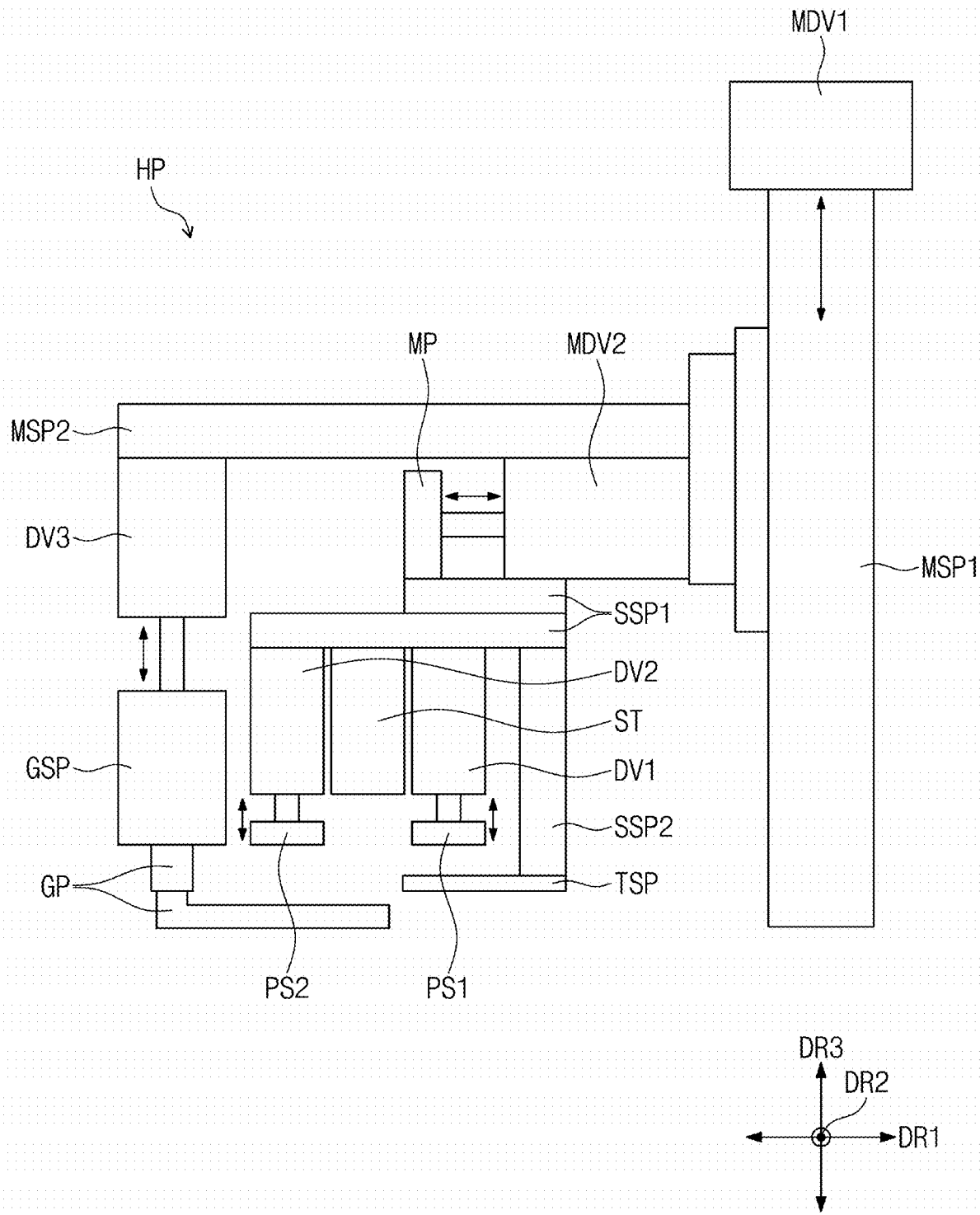
FIGS. 2 and 3 are views illustrating one of head portions of FIG. 1.
Figure 3:
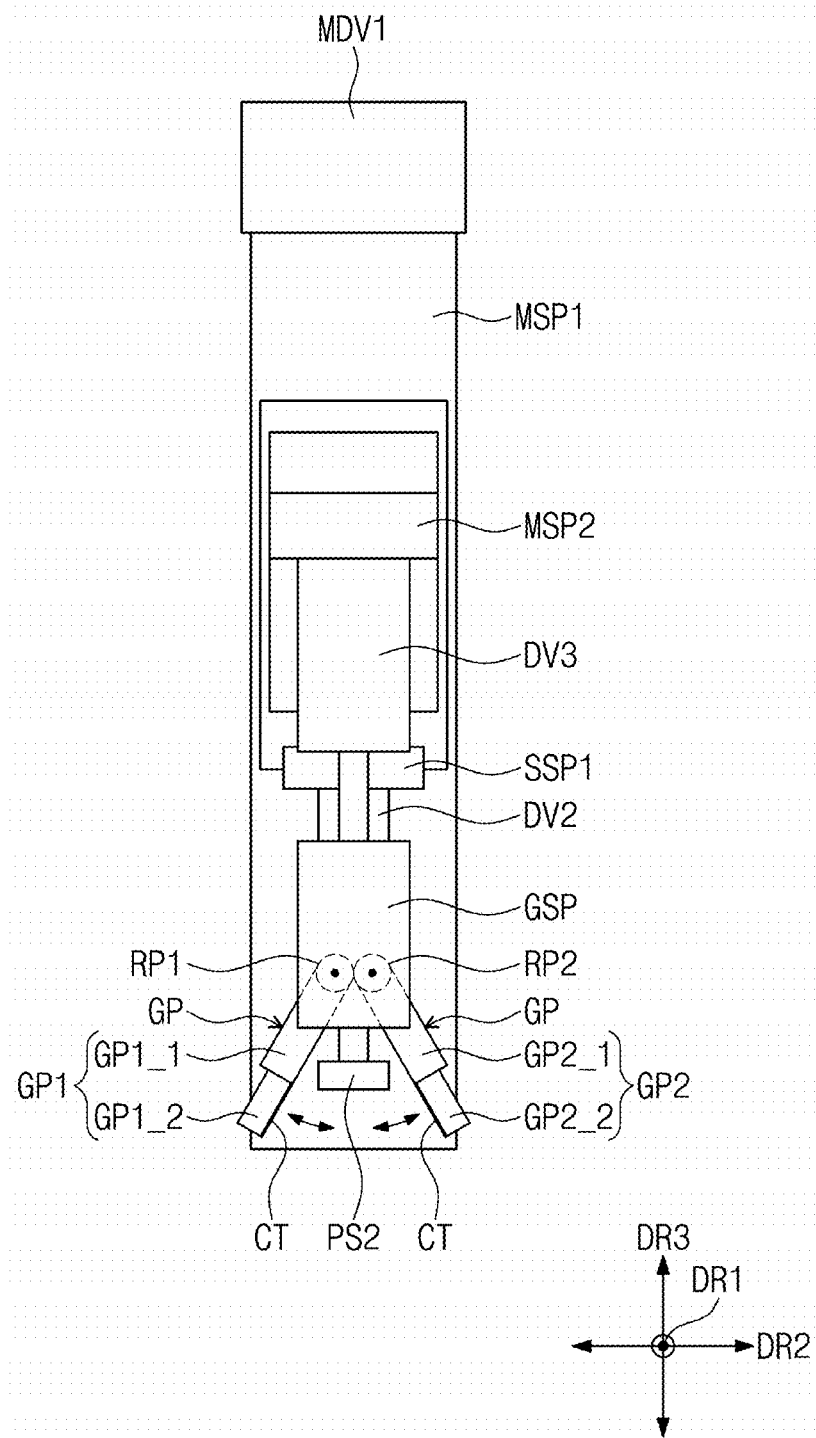

FIGS. 2 and 3 are views illustrating one of head portions of FIG. 1. FIG. 2 is a view of the head portion HP when viewed in the second direction DR2, and FIG. 3 is a view of the head portion HP when viewed in the first direction DR1. One head portion HP is illustrated as an example in FIGS. 2 and 3. However, other head portions HP may have the same structure or components as illustrated in FIGS. 2 and 3.

Referring to FIGS. 2 and 3, the head portion HP may include first and second main support portions MSP1 and MSP2, first and second sub-support portions SSP1 and SSP2, a tape support portion TSP, a grip support portion GSP, first and second main driving portions MDV1 and MDV2, first, second and third driving portions DV1, DV2 and DV3, a suction portion ST, and a grip portion GP.

The first main support portion MSP1 may extend in the third direction DR3, and the first main driving portion MDV1 may be connected to an upper portion of the first main support portion MSP1. The first main driving portion MDV1 may move the first main support portion MSP1 in upward and downward directions. The upward and downward directions may be the upward and downward directions of the third direction DR3.

The second main support portion MSP2 may extend in the first direction DR1 and may be connected to a predetermined portion of the first main support portion MSP1. The second main driving portion MDV2 may be connected to a bottom of one side (e.g., right side in FIG. 2) of the second main support portion MSP2 adjacent to the first main support portion MSP1, and a moving portion MP may be connected to a left side of the second main driving portion MDV2. The second main driving portion MDV2 may reciprocate the moving portion MP in the first direction DR1.

The first sub-support portion SSP1 may be connected to a bottom of the moving portion MP and may extend in the first direction DR1. The second sub-support portion SSP2 extending in the third direction DR3 may be connected to a bottom of one side of the first sub-support portion SSP1 (e.g., right side in FIG. 2), closer to the first main support portion MSP1 than another side (e.g., left side in FIG. 2), of the first sub-support portion SSP1 is to the first main support portion MSP1.

The first driving portion DV1, the suction portion ST and the second driving portion DV2 may be connected to a bottom of the first sub-support portion SSP1. The first driving portion DV1 may be disposed adjacent to the second sub-support portion SSP2. The second driving portion DV2 may be disposed at a left side of the first driving portion DV1 so as to be connected to a bottom of another side of the first sub-support portion SSP1 opposite to the one side of the first sub-support portion SSP1. The suction portion ST may be disposed between the first driving portion DV1 and the second driving portion DV2.

The tape support portion TSP may be connected to a bottom of the second sub-support portion SSP2 and may extend in the first direction DR1. A first pressing portion PS1 may be connected to a bottom of the first driving portion DV1, and the first driving portion DV1 may vertically move the first pressing portion PS1. A second pressing portion PS2 may be connected to a bottom of the second driving portion DV2, and the second driving portion DV2 may vertically move the second pressing portion PS2.

The tape support portion TSP may be spaced apart from the first pressing portion PS1 and may be disposed under the first pressing portion PS1. The second driving portion DV2 and the second pressing portion PS2 may be disposed at a left side of the first driving portion DV1 and the first pressing portion PS1 when viewed in the second direction DR2.

The third driving portion DV3 may be connected to a bottom of another side (e.g., left side in FIG. 2) of the second main support portion MSP2 opposite to the one side of the second main support portion MSP2. The grip support portion GSP may be connected to a bottom of the third driving portion DV3, and the grip portion GP may be connected to a bottom of the grip support portion GSP. The third driving portion DV3 may vertically move the grip support portion GSP to vertically move the grip portion GP. The grip support portion GSP and the grip portion GP may be spaced apart from the second pressing portion PS2. The grip portion GP may have an L-shape when viewed in the second direction DR2.

The grip portion GP may include a first grip portion GP1 and a second grip portion GP2 spaced apart from each other. The second pressing portion PS2 may move in the downward direction and the upward direction through a space between the first grip portion GP1 and the second grip portion GP2. Each of the first and second grip portions GP1 and GP2 may have an L-shape when viewed in the second direction DR2. A top end of the first grip portion GP1 and a top end of the second grip portion GP2 may be connected in the grip support portion GSP and may be disposed adjacent to each other.

A first rotating unit RP1 may be connected to the top end of the first grip portion GP1, and a second rotating unit RP2 may be connected to the top end of the second grip portion GP2. The first rotating unit RP1 and the second rotating unit RP2 may rotate the top end of the first grip portion GP1 and the top end of the second grip portion GP2, respectively. Since the top ends of the first and second grip portions GP1 and GP2 are rotated by the first and second rotating units RP1 and RP2, respectively, the first grip portion GP1 and the second grip portion GP2 may move closer to each other.

The first grip portion GP1 may include a first sub-grip portion GP1_1 connected to the first rotating unit RP1 of the grip support portion GSP, and a second sub-grip portion GP1_2 connected to a bottom of the first sub-grip portion GP1_1 and having an L-shape when viewed in the second direction DR2. The second grip portion GP2 may include a third sub-grip portion GP2_1 connected to the second rotating unit RP2 of the grip support portion GSP, and a fourth sub-grip portion GP2_2 connected to a bottom of the third sub-grip portion GP2_1 and having an L-shape when viewed in the second direction DR2.

Since top ends of the first and third sub-grip portions GP1_1 and GP2_1 are rotated by the first and second rotating units RP1 and RP2, the second and fourth sub-grip portions GP1_2 and GP2_2 connected to the first and third sub-grip portions GP1_1 and GP2_1 may move closer to each other. Anti-adhesion coating layers CT may be respectively provided on one side surface (e.g., right side surface in FIG. 3) of the second sub-grip portion GP1_2 and one side surface (e.g., left side surface in FIG. 3) of the fourth sub-grip portion GP2_2, which face each other. In an exemplary embodiment, each of the anti-adhesion coating layers CT may be a fluorine coating layer, for example.

Since the first main driving portion MDV1 may move the first main support portion MSP1 in the upward and downward directions, the tape support portion TSP, the first and second pressing portions PS1 and PS2, the suction portion ST and the grip portion GP may be moved together in the upward and downward directions by the first main driving portion MDV1. In addition, since the second main driving portion MDV2 may reciprocate the first sub-support portion SSP1 in the first direction DR1, the first and second pressing portions PS1 and PS2 and the tape support portion TSP may be reciprocated together in the first direction DR1 by the second main driving portion MDV2.

Figure 4:
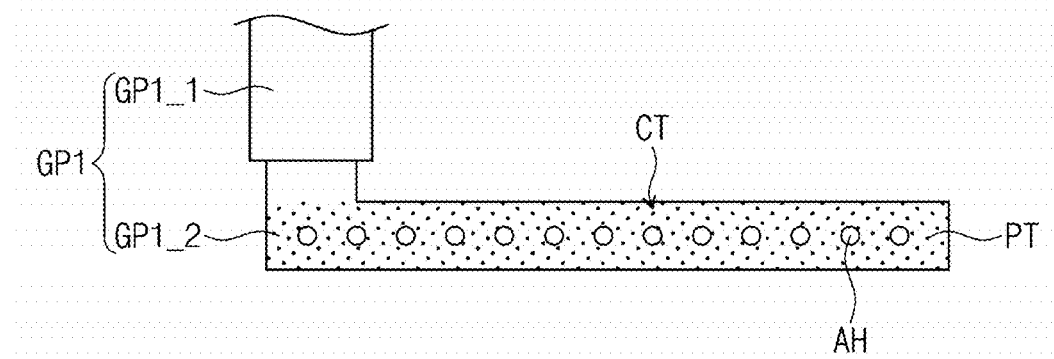
FIG. 4 is a view illustrating one side surface of a second sub-grip portion of FIG. 3.

FIG. 4 is a view illustrating one side surface of a second sub-grip portion of FIG. 3. Even though not shown in FIG. 4, the one side surface of the fourth sub-grip portion GP2_2 may have the same components as the one side surface of the second sub-grip portion GP1_2 illustrated in FIG. 4.

Referring to FIG. 4, a plurality of air jet holes AH may be disposed at the one side surface of the second sub-grip portion GP1_2. Air may jet to the outside through the air jet holes AH. The one side surface of the second sub-grip portion GP1_2 may have an uneven structure. In an exemplary embodiment, the one side surface of the second sub-grip portion GP1_2 may include a plurality of protrusions PT, for example. Likewise, the air jet holes AH may also be disposed at the one side surface of the fourth sub-grip portion GP2_2, and the one side surface of the fourth sub-grip portion GP2_2 may also have the uneven structure.

Figure 5:
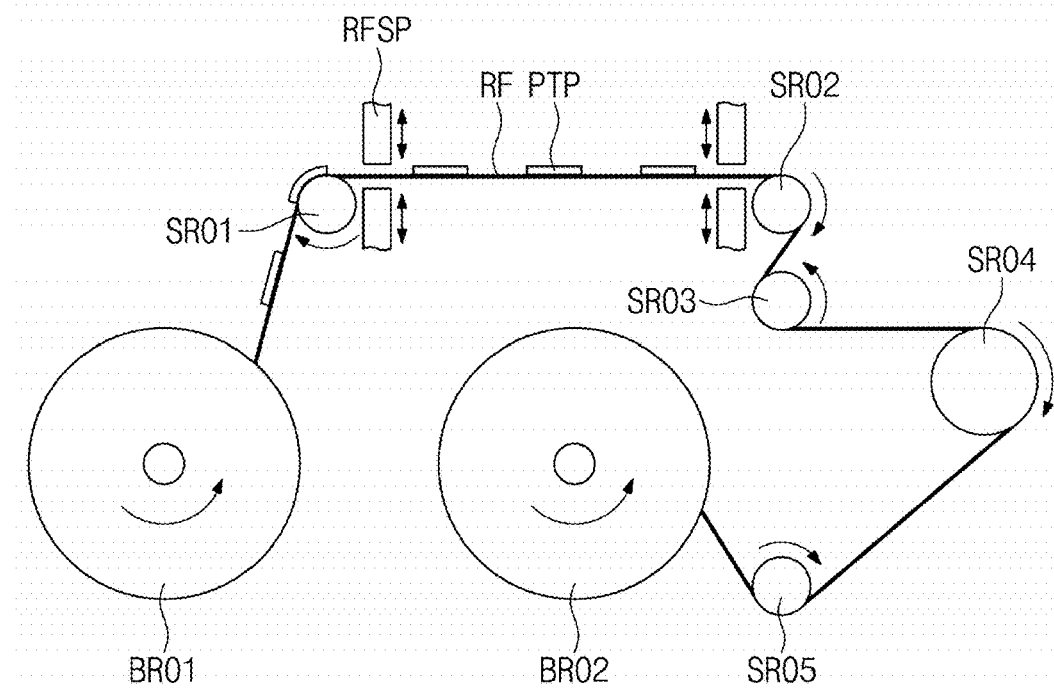
FIG. 5 is a view illustrating a peeling tape supply portion of FIG. 1.
Figure 6:
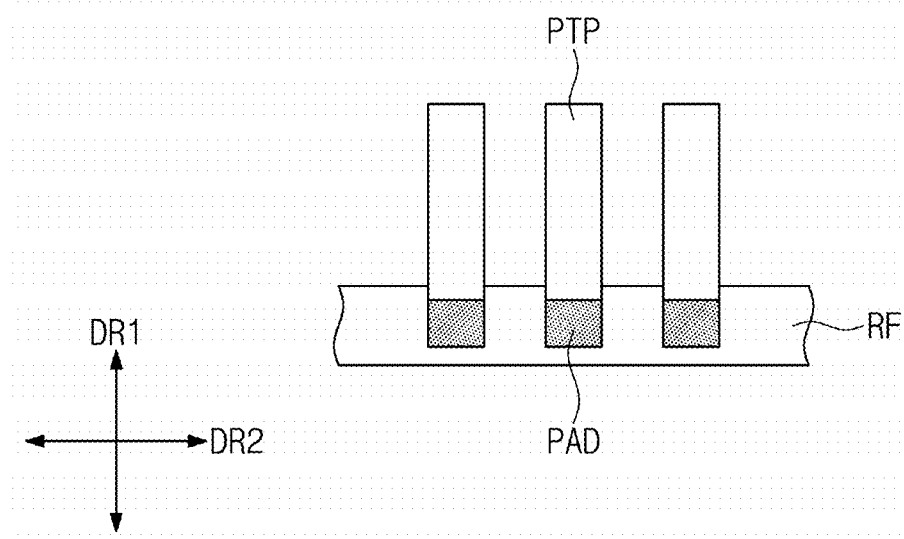
FIG. 6 is a plan view illustrating peeling tapes of FIG. 5.

FIG. 5 is a view illustrating a peeling tape supply portion of FIG. 1. FIG. 6 is a plan view illustrating peeling tapes of FIG. 5.

Referring to FIGS. 5 and 6, the peeling tape supply portion 200 may include first and second big rollers BRO1 and BRO2, first to fifth small rollers SRO1 to SRO5, a rolling film RF, and a plurality of peeling tapes PTP.

The peeling tapes PTP may be attached or adhere on the rolling film RF, and the rolling film RF may be wound on the first big roller BRO1. The rolling film RF may extend in the second direction DR2, and the peeling tapes PTP may extend in the first direction DR1. One side of each of the peeling tapes PTP may be provided in the head portion HP, and another side of each of the peeling tapes PTP may be attached or adhere on the rolling film RF. A peeling adhesive PAD may be disposed on the another side of each of the peeling tapes PTP. The peeling adhesive PAD may be attached to a bottom of the another side of each of the peeling tapes PTP.

Diameters of the first and second big rollers BRO1 and BRO2 may be greater than those of the first to fifth small rollers SRO1 to SRO5. The first and second big rollers BRO1 and BRO2 and the first to fifth small rollers SRO1 to SRO5 may move the rolling film RF while rotating. In an exemplary embodiment, the first and second big rollers BRO1 and BRO2 and the third small roller SRO3 may rotate in a counterclockwise direction, and the first, second, fourth and fifth small rollers SRO1, SRO2, SRO4 and SRO5 may rotate in a clockwise direction, for example.

The rolling film RF wound on the first big roller BRO1 may be provided to the first small roller SRO1 and then may be provided to the second small roller SRO2 via the first small roller SRO1. The first and second small rollers SRO1 and SRO2 may move the rolling film RF while rotating, and the rolling film RF may be moved in contact with outer circumferential surfaces of the first and second small rollers SRO1 and SRO2.

The peeling tapes PTP disposed between the first and second small rollers SRO1 and SRO2 may be detached or separated from the rolling film RF and may be provided to the head portions HP, respectively. When the peeling tapes PTP are detached from the rolling film RF so as to be provided to the head portions HP, the operation of rotating the first and second small rollers SRO1 and SRO2 may be stopped. The number of the peeling tapes PTP disposed between the first and second small rollers SRO1 and SRO2 may be equal to the number of the head portions HP, and thus the peeling tapes PTP between the first and second small rollers SRO1 and SRO2 may be provided to the head portions HP, respectively.

When the peeling tapes PTP are detached from the rolling film RF, a plurality of rolling film support members RFSP may be provided over and under the rolling film RF disposed between the first and second small rollers SRO1 and SRO2 to prevent the rolling film RF from shaking. The rolling film support members RFSP disposed over the rolling film RF may overlap with the rolling film support members RFSP disposed under the rolling film RF.

When the peeling tapes PTP are detached from the rolling film RF, the rolling film support members RFSP disposed over and under the rolling film RF may move toward the rolling film RF to contact the rolling film RF, and thus the rolling film support members RFSP may support the rolling film RF to prevent the rolling film RF from following the peeling tapes PTP.

After the peeling tapes PTP are provided to the head portions HP, the rolling film RF may be provided to and wound on the second big roller BRO2 through the third, fourth and fifth small rollers SRO3, SRO4 and SRO5 which are rotated. The rolling film RF may be moved in contact with outer circumferential surfaces of the third, fourth and fifth small rollers SRO3, SRO4 and SRO5.

Figure 7:
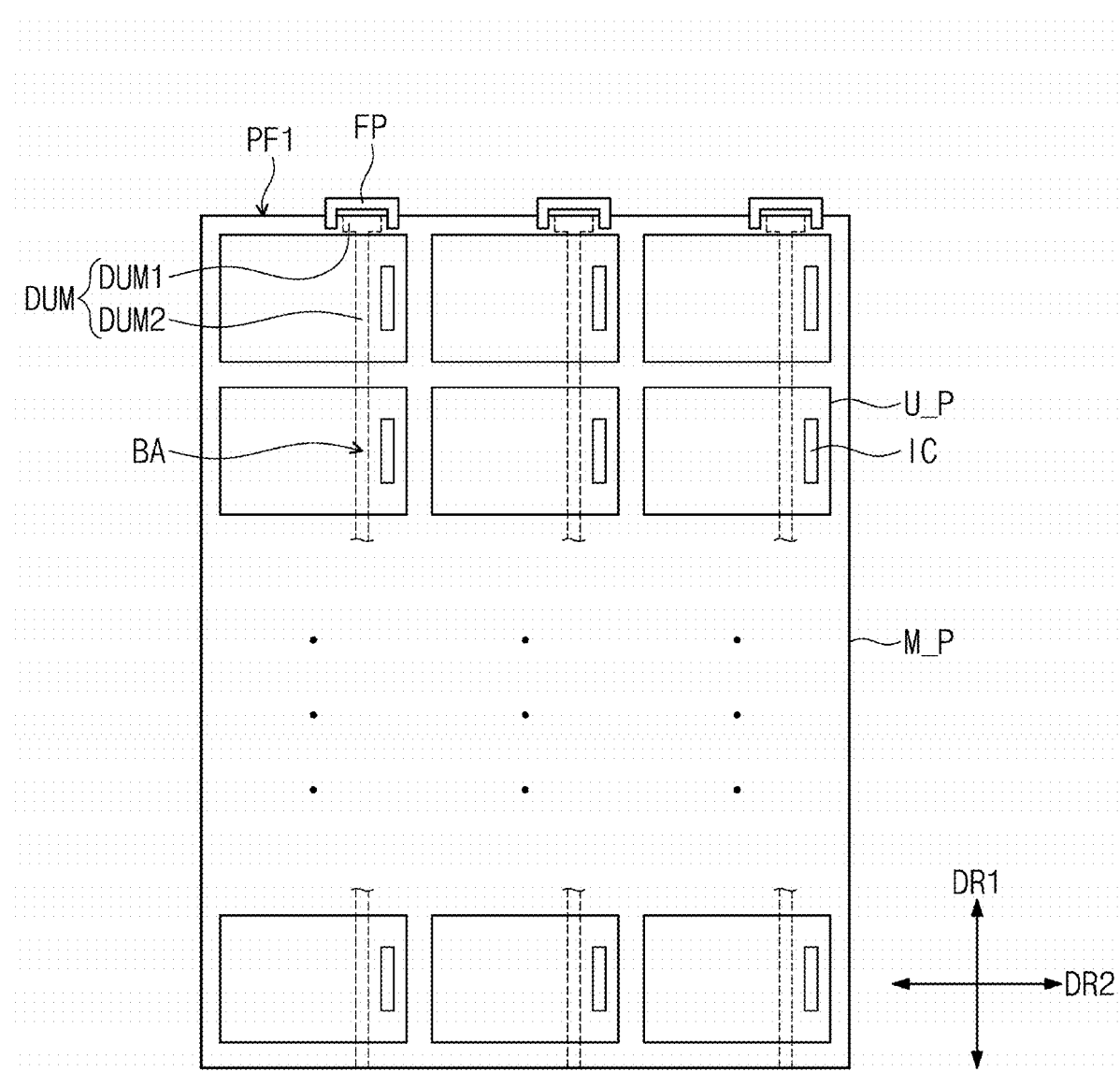
FIG. 7 is a plan view illustrating a mother panel of FIG. 1.
Figure 8:
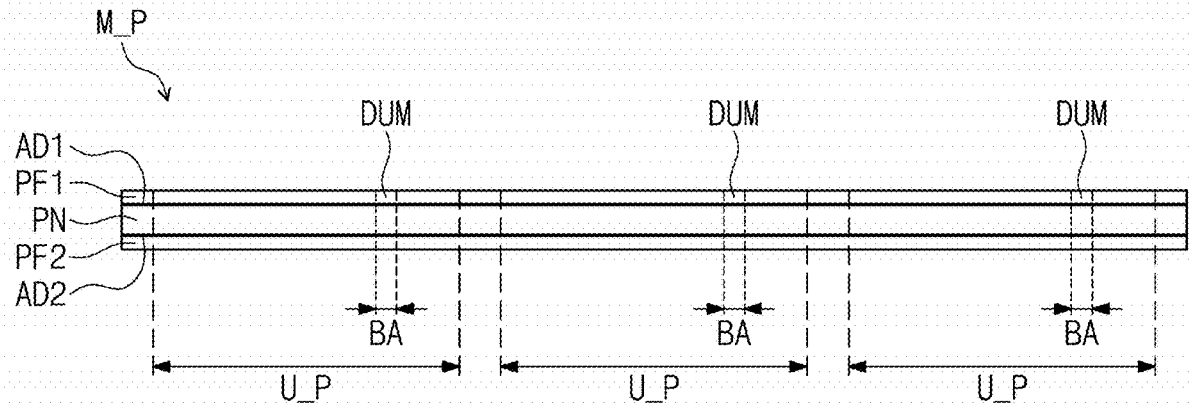
FIG. 8 is a cross-sectional view illustrating the mother panel of FIG. 1.
Figure 8:
Figure 9:
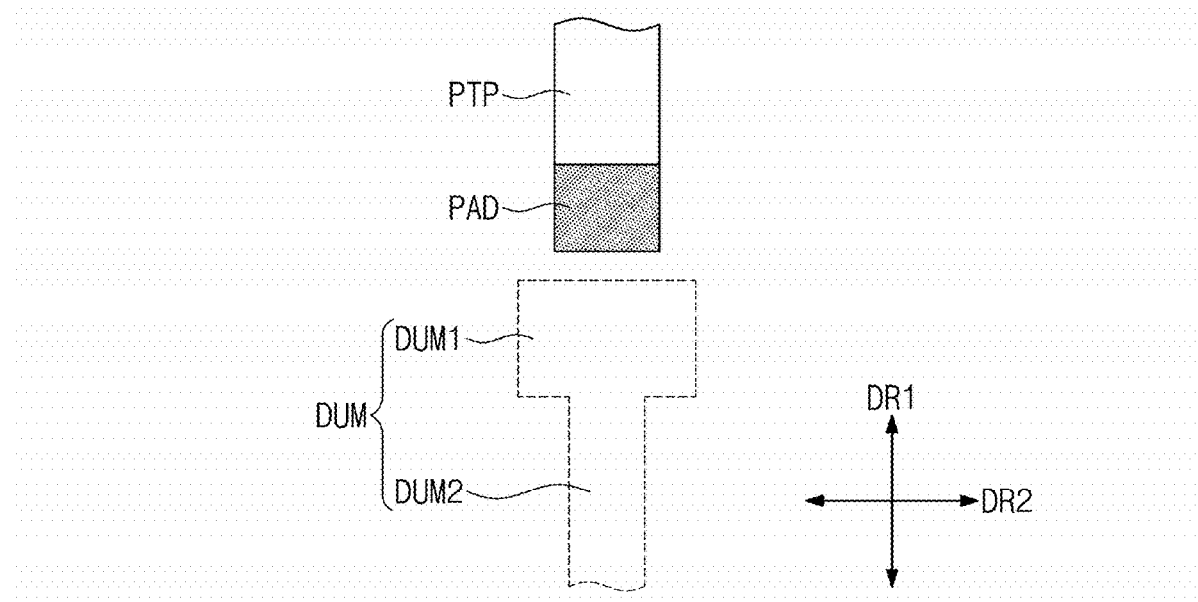
FIG. 9 is a plan view for explaining widths of a first dummy portion, a second dummy portion and the peeling tape.
Figure 10:
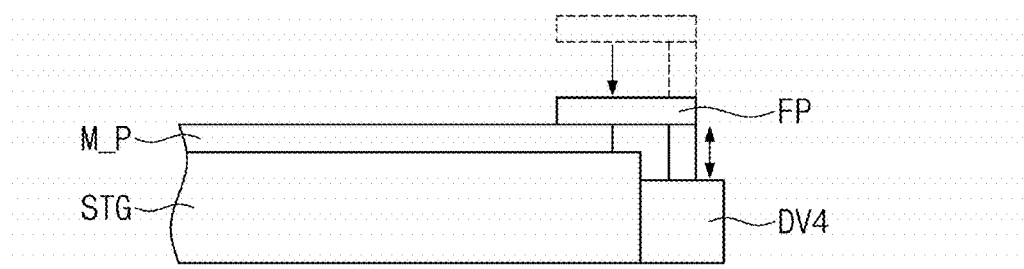
FIG. 10 is a cross-sectional view illustrating a fixing portion of FIG. 7.

FIG. 7 is a plan view illustrating a mother panel of FIG. 1. FIG. 8 is a cross-sectional view illustrating the mother panel of FIG. 1. FIG. 9 is a plan view for explaining widths of a first dummy portion, a second dummy portion and the peeling tape. FIG. 10 is a cross-sectional view illustrating a fixing portion of FIG. 7.

Referring to FIGS. 7, 8 and 9, the mother panel M_P may include a plurality of unit panels U_P arranged along rows and columns in a plan view defined by the first and second directions DR1 and DR2. The rows may be parallel to the second direction DR2, and the columns may be parallel to the first direction DR1. Each of the unit panels U_P may have a rectangular shape that has short sides parallel to the first direction DR1 and long sides parallel to the second direction DR2.

Each of the unit panels U_P may include a driving chip IC and a plurality of pixels (not shown) driven by the driving chip IC. The driving chip IC may be disposed adjacent to one of the short sides of the unit panel U_P. Each of the unit panels U_P may include a bending portion BA extending in the first direction DR1, and the driving chip IC may be disposed between the bending portion BA and the one short side of the unit panel U_P.

The mother panel M_P may include a panel PN, a first protective film PF1, a second protective film PF2, a first adhesive member AD1, and a second adhesive member AD2. The first protective film PF1 may be disposed on one surface (e.g., upper surface in FIG. 8) of the panel PN, and the second protective film PF2 may be disposed on another surface (e.g., lower surface in FIG. 8) of the panel PN opposite to the one surface of the panel PN. When the mother panel M_P is placed on the stage STG, the second protective film PF2 may face the stage STG (refer to FIG. 1) and the first protective film PF1 may be disposed over the second protective film PF2.

The first adhesive member AD1 may be disposed between the panel PN and the first protective film PF1 to attach the first protective film PF1 to the one surface (e.g., upper surface in FIG. 8) of the panel PN. The second adhesive member AD2 may be disposed between the panel PN and the second protective film PF2 to attach the second protective film PF2 to the another surface (e.g., lower surface in FIG. 8) of the panel PN.

Even though not shown in FIG. 8, the driving chips IC and the pixels may be disposed in the panel PN, and the panel PN may also include the unit panels U_P in a plan view.

The first protective film PF1 may include a plurality of dummy portions DUM which may extend in the first direction DR1 and may be arranged in the second direction DR2. Each of the dummy portions DUM may extend through the bending portions BA of the unit panels U_P arranged in the first direction DR1. The dummy portions DUM may overlap with the bending portions BA in the unit panels U_P.

Each of the dummy portions DUM may include a first dummy portion DUM1 disposed on a predetermined portion of one side of the first protective film PF1, and a second dummy portion DUM2 extending from the first dummy portion DUM1 in the first direction DR1. The first dummy portion DUM1 may define one side (e.g., upper side in FIG. 9) of each of the dummy portions DUM, and the second dummy portion DUM2 may extend to overlap with the bending portions BA of the unit panels U_P arranged in the first direction DR1.

A width of the first dummy portion DUM1 in the second direction DR2 may be greater than a width of the second dummy portion DUM2 in the second direction DR2. In addition, a width of the peeling tape PTP in the second direction DR2 may be less than the width of the first dummy portion DUM1 and may be greater than the width of the second dummy portion DUM2. However, the invention is not limited thereto. In some exemplary embodiments, the width of the peeling tape PTP may be equal to the width of the first dummy portion DUM1. The another side (e.g., lower side in FIG. 9) of the peeling tape PTP may adhere on the first dummy portion DUM1 by the peeling adhesive PAD.

The unit panels U_P arranged along three columns are illustrated as an example in FIG. 7. However, the invention is not limited thereto. In some exemplary embodiments, the unit panels U_P arranged along one, two, four or more columns may be provided in the mother panel M_P. In an alternative exemplary embodiment, one unit panel U_P may be provided in the mother panel M_P.

The head portions HP (refer to FIG. 1) may be disposed to correspond to the columns of the unit panels U_P, and the head portions HP may peel the dummy portions DUM from the mother panel M_P, respectively. However, the invention is not limited thereto. In some exemplary embodiments, one head portion HP may be provided to peel the dummy portions DUM one by one.

Referring to FIGS. 7 and 10, a plurality of fixing portions FP may be disposed at one side (e.g., right side in FIG. 10) of the stage STG adjacent to the first dummy portions DUM1, each of which defines the one side of each of the dummy portions DUM. The fixing portions FP may be connected to a plurality of fourth driving portions DV4 which may be respectively disposed under the fixing portions FP and which may be connected to the one side of the stage STG.

The fourth driving portions DV4 may move the fixing portions FP in the upward and downward directions. The fixing portions FP may be moved in the downward direction to press the mother panel M_P adjacent to the first dummy portions DUM1, and thus the mother panel M_P may be fixed by the fixing portions FP. Substantially, the fixing portions FP may press the first protective film PF1 to fix the mother panel M_P. When the first dummy portions DUM1 are peeled, the fixing portions FP may prevent a lifting phenomenon of the one side of the mother panel M_P adjacent to the first dummy portions DUM1.

Figure 11:
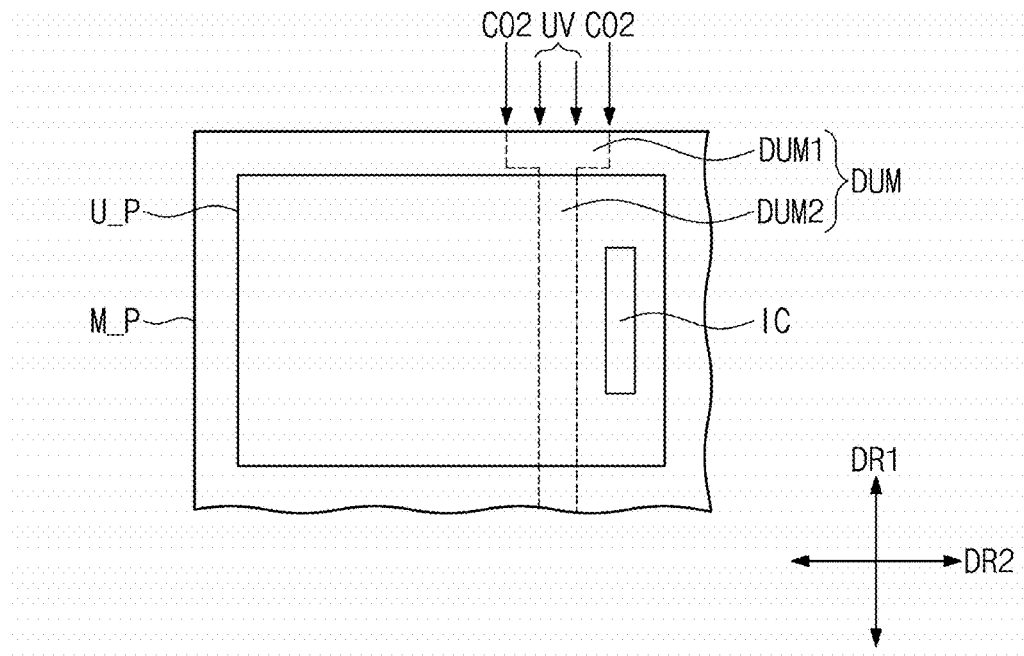
FIGS. 11 and 12 are views illustrating a mother panel before the mother panel is provided in a peeling apparatus through a stage.
Figure 12:
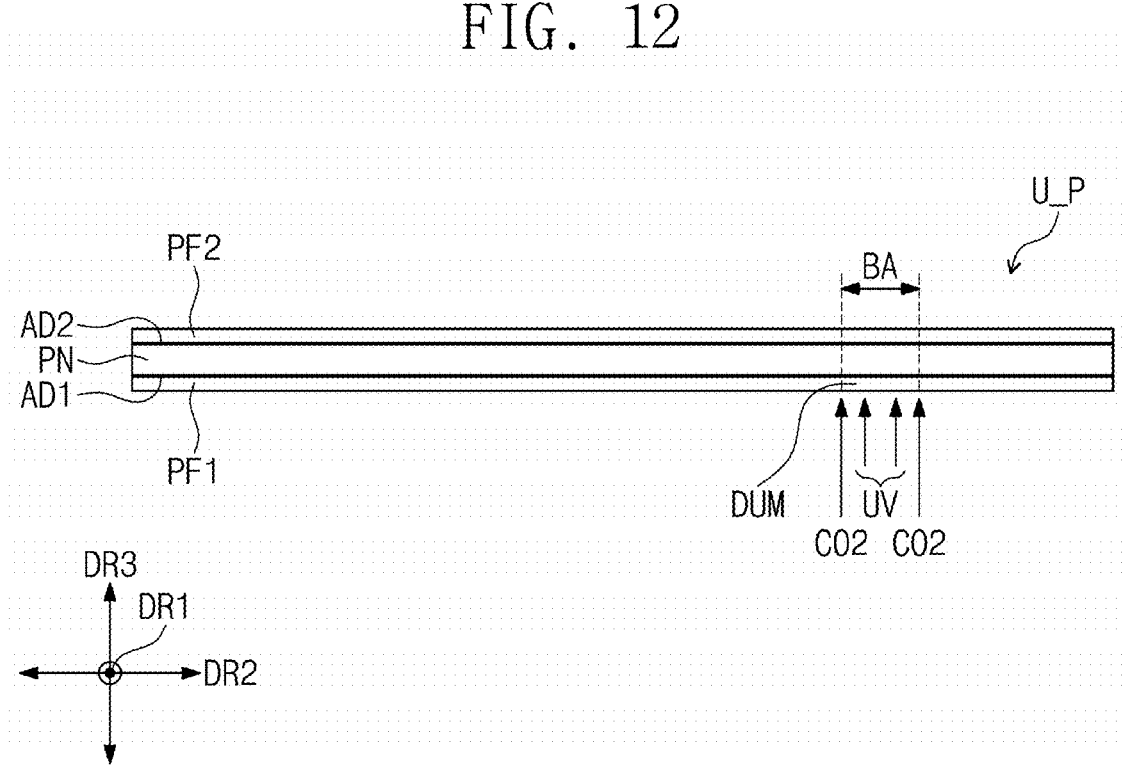

FIGS. 11 and 12 are views illustrating a mother panel before the mother panel is provided in a peeling apparatus through a stage. One unit panel U_P is illustrated in FIGS. 11 and 12 for the purpose of ease and convenience in description and illustration.

Referring to FIGS. 11 and 12, ultraviolet laser UV may be irradiated to the dummy portion DUM of the mother panel M_P, and $CO_2$ laser CO2 may be irradiated to a boundary of the dummy portion DUM. When the ultraviolet laser UV and the $CO_2$ laser CO2 are irradiated, the mother panel M_P may be turned over, unlike FIG. 8. In other words, the first protective film PF1 may be disposed under the second protective film PF2, and the ultraviolet laser UV and the $CO_2$ laser CO2 may be irradiated to the dummy portion DUM of the first protective film PF1 under the mother panel M_P.

The boundary of the dummy portion DUM may be cut by the $CO_2$ laser CO2, and adhesive strength of the first adhesive member AD1 on the dummy portion DUM may be reduced by the ultraviolet laser UV. The panel PN may include a base substrate including polyimide and the pixels disposed on the base substrate. When the ultraviolet laser UV is irradiated to the base substrate, hydrogen may be generated from the base substrate to reduce the adhesive strength between the base substrate and the first adhesive member AD1.

When the ultraviolet laser UV is irradiated for a time equal to or greater than a reference time, the first adhesive member AD1 may be carbonized. The ultraviolet laser UV may be irradiated to the first dummy portion DUM1 for a time equal to or greater than the reference time and may be irradiated to the second dummy portion DUM2 for a time less than the reference time. Thus, the first adhesive member AD1 on the first dummy portion DUM1 may be carbonized.

The mother panel M_P treated by the ultraviolet laser UV and the $CO_2$ laser CO2 may be placed on the stage STG (refer to FIG. 10). When the mother panel M_P is placed on the stage STG, the second protective film PF2 may be disposed under the first protective film PF1 and may be placed on the stage STG, and the first protective film PF1 may face the head portion HP.

FIGS. 13 to 20 are views illustrating a method of peeling a protective film using the peeling apparatus of FIG. 1. Peeling operations of the head portions HP may be the same as each other, and thus the peeling operation of one head portion HP will be described hereinafter as an example with reference to FIGS. 13 to 20. The stage STG is omitted in FIGS. 13 to 20 for the purpose of ease and convenience in description and illustration.

Figure 13:
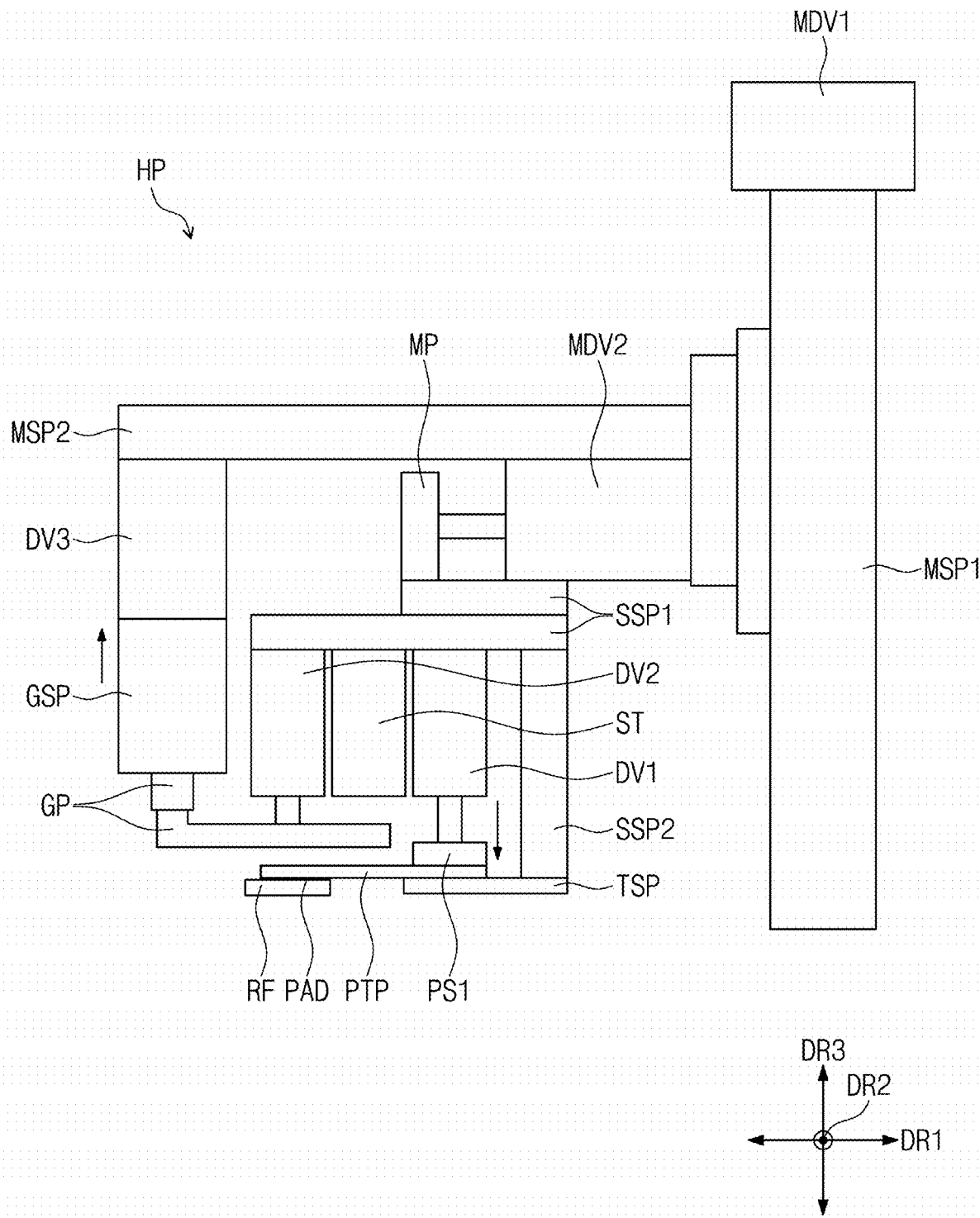
FIGS. 13 to 20 are views illustrating a method of peeling a protective film using the peeling apparatus of FIG. 1.

Referring to FIG. 13, the head portion HP may move to be adjacent to the peeling tape supply portion 200 (refer to FIG. 1), and the peeling tape PTP may be provided to the head portion HP through the rolling film RF. The one side (e.g., right side of FIG. 13) of the peeling tape PTP may be disposed on the tape support portion TSP, and the tape support portion TSP may be disposed under the one side of the peeling tape PTP to support the one side of the peeling tape PTP.

The first pressing portion PS1 may move in the downward direction by the first driving portion DV1 to press the one side of the peeling tape PTP to the tape support portion TSP. Since the first pressing portion PS1 presses the one side of the peeling tape PTP, the one side of the peeling tape PTP may be fixed between the first pressing portion PS1 and the tape support portion TSP. The one side of the peeling tape PTP may be fixed on the tape support portion TSP, and the peeling tape PTP may be detached from the rolling film RF. The head portion HP supplied with the peeling tape PTP may move onto the stage STG (refer to FIG. 1) on which the mother panel M_P is disposed.

The grip portion GP may be disposed over the dummy portion DUM (refer to FIG. 16) and may move in the upward direction by the third driving portion DV3 so as to be disposed above the tape support portion TSP. The second pressing portion PS2 may be disposed between the first grip portion GP1 (refer to FIG. 3) and the second grip portion GP2 (refer to FIG. 3).

Figure 14:
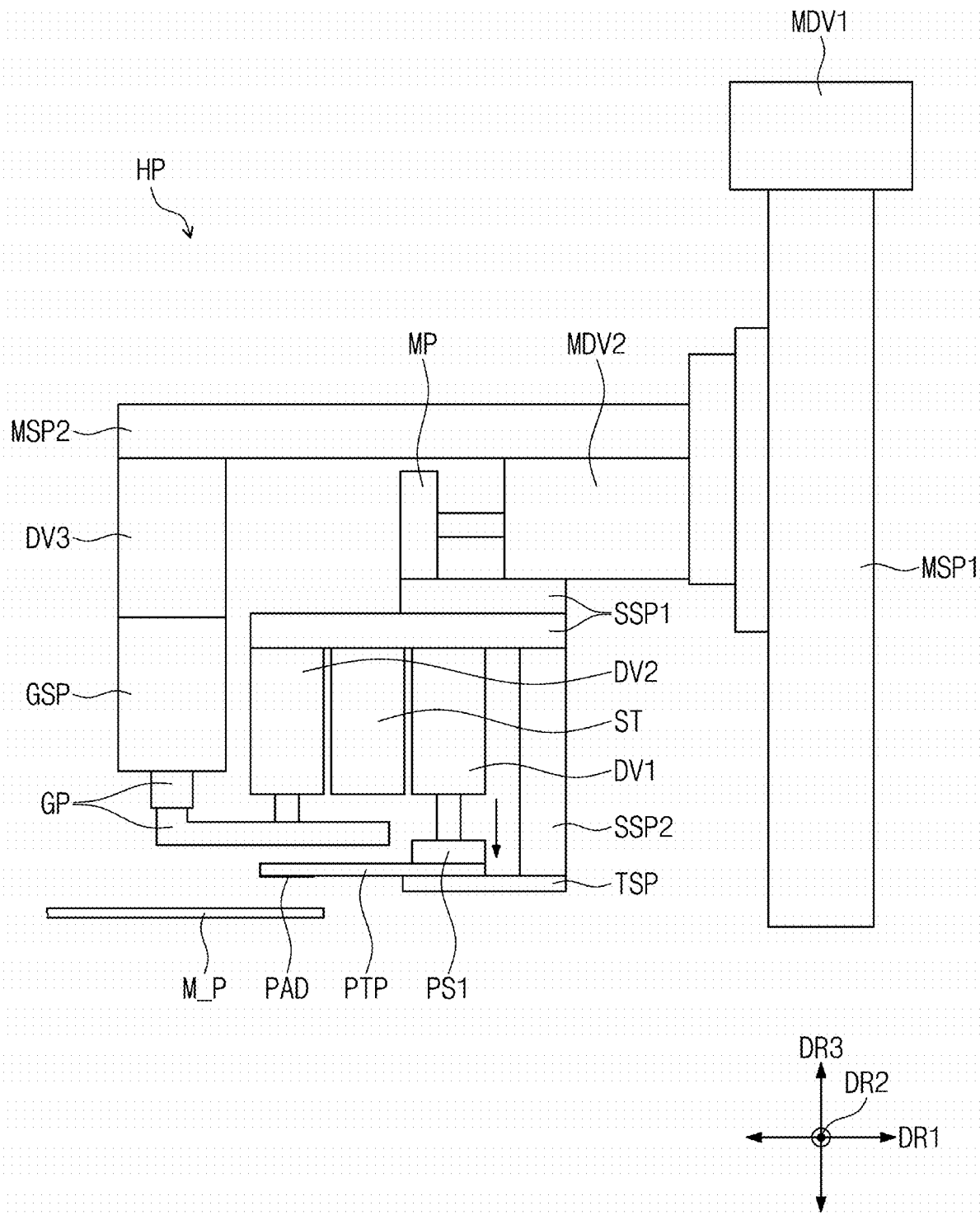

Referring to FIG. 14, the mother panel M_P may move under the head portion HP by the stage STG (refer to FIG. 1). The another side (e.g., left side in FIG. 14) of the peeling tape PTP may be disposed over the first dummy portion DUM1 (refer to FIG. 16) of the first protective film PF1 to overlap with the first dummy portion DUM1. The second pressing portion PS2 (refer to FIG. 15) may be disposed over the another side of the peeling tape PTP to overlap with the another side of the peeling tape PTP.

Figure 15:
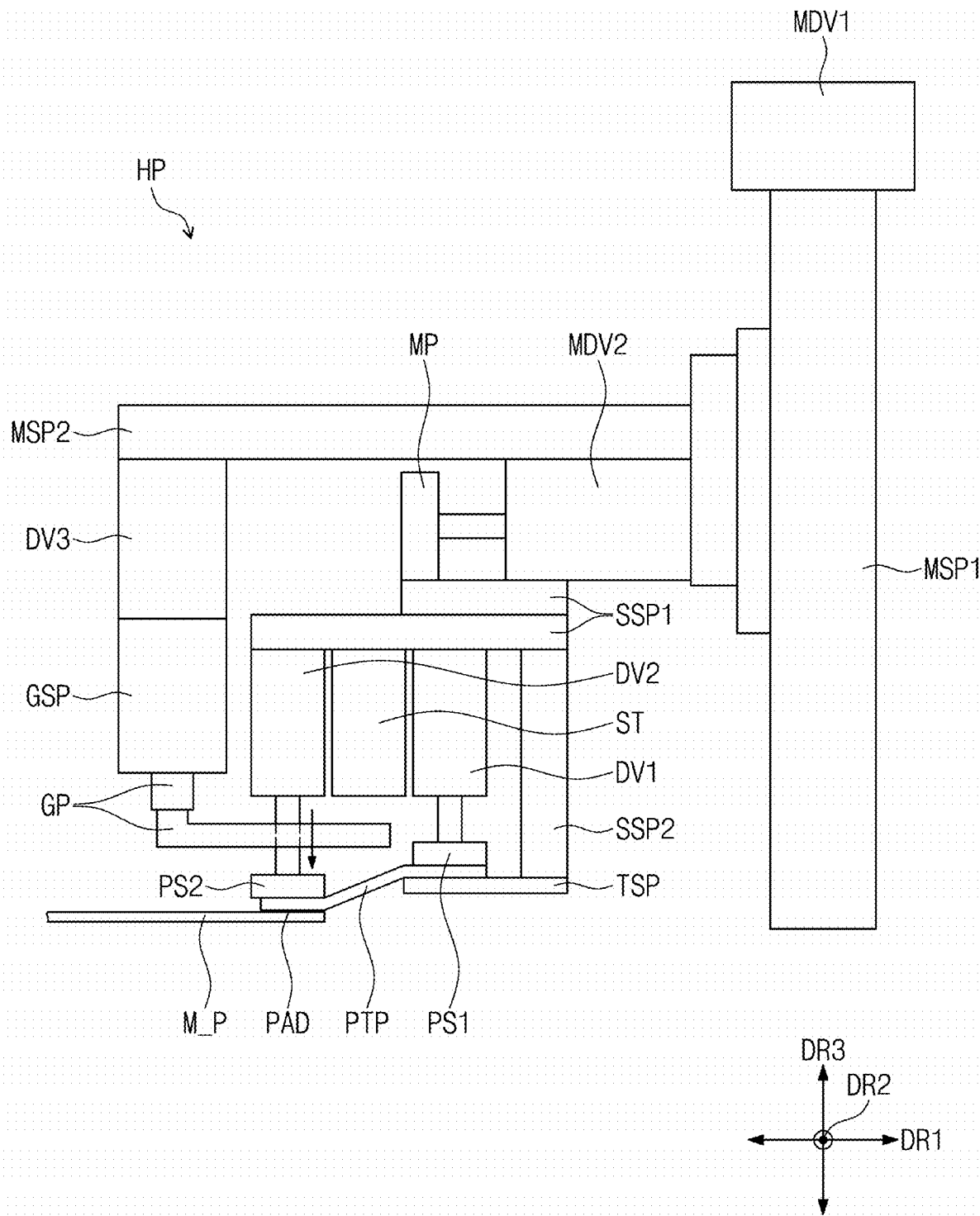

Referring to FIG. 15, the second pressing portion PS2 may move in the downward direction between the first and second grip portions GP1 (refer to FIG. 3) and GP2 (refer to FIG. 3) by the second driving portion DV2. The second pressing portion PS2 may move in the downward direction to press the another side (e.g., left side in FIG. 15) of the peeling tape PTP to the first dummy portion DUM1 (refer to FIG. 16). The another side of the peeling tape PTP may be attached to the first dummy portion DUM1 by the peeling adhesive PAD provided on the another side of the peeling tape PTP.

Figure 16:
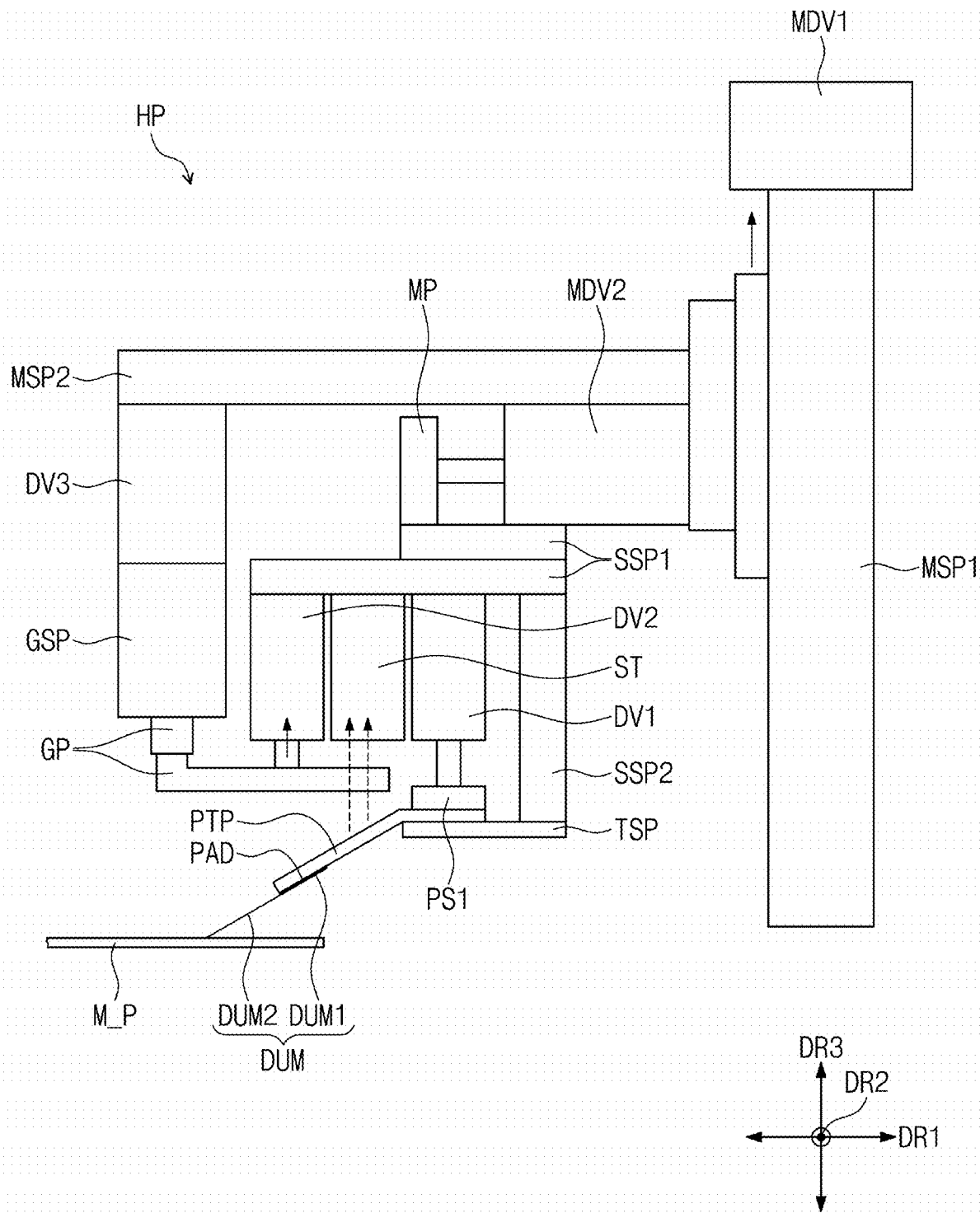

Referring to FIG. 16, the second pressing portion PS2 (refer to FIG. 15) may move in the upward direction by the second driving portion DV2 after attaching the another side of the peeling tape PTP to the first dummy portion DUM1. Thereafter, the first main driving portion MDV1 may move the first main support portion MSP1 in the upward direction, and thus the tape support portion TSP, the first and second pressing portions PS1 and PS2, the suction portion ST and the grip portion GP may move together in the upward direction.

Since the first pressing portion PS1 fixes the one side of the peeling tape PTP on the tape support portion TSP, the one side of the dummy portion DUM attached to the another side of the peeling tape PTP may be peeled and then another portion of the dummy portion DUM may be peeled while the peeling tape PTP moves in the upward direction. In an exemplary embodiment, the first dummy portion DUM1 may be peeled from the mother panel M_P, and then, a predetermined portion of the second dummy portion DUM2 may also be peeled from the mother panel M_P as the first pressing portion PS1 and the tape support portion TSP move in the upward direction, for example.

When the first dummy portion DUM1 is peeled, the lifting phenomenon of the mother panel M_P may be prevented since the fixing portion FP of FIGS. 7 and 10 fixes the mother panel M_P. The peeling adhesive PAD may have an adhesive strength stronger than that of the first adhesive member AD1 (refer to FIG. 12). Thus, the first dummy portion DUM1 may be easily peeled by the peeling adhesive PAD.

Since the first adhesive member AD1 overlapping with the first dummy portion DUM1 is carbonized, an initial process of peeling the first dummy portion DUM1 may be easily performed. When carbonized particles of the first adhesive member AD1 overlapping with the first dummy portion DUM1 are dispersed, the carbonized particles may be adsorbed on the mother panel M_P to contaminate the mother panel M_P. When the first dummy portion DUM1 is peeled, the suction portion ST may operate to suck and remove the carbonized particles of the first adhesive member AD1.

Figure 17:
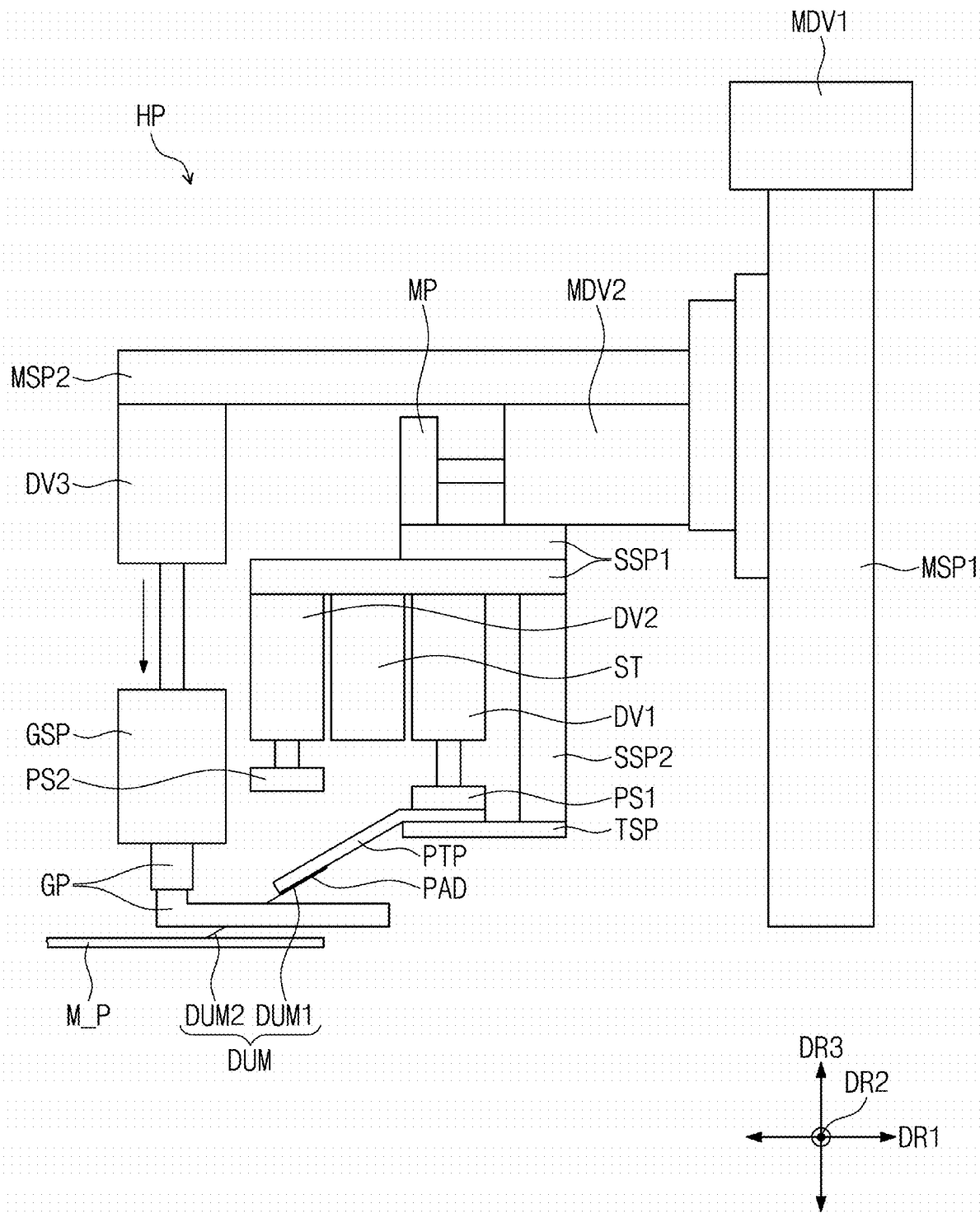

Referring to FIG. 17, after a predetermined portion of the dummy portion DUM is peeled, the grip portion GP may move in the downward direction by the third driving portion DV3 so as to be disposed below the tape support portion TSP. The first grip portion GP1 (refer to FIG. 3) and the second grip portion GP2 (refer to FIG. 3) may move to be adjacent to each other and may grip the peeled predetermined portion of the second dummy portion DUM2. In more detail, the second sub-grip portion GP1_2 (refer to FIG. 3) and the fourth sub-grip portion GP2_2 (refer to FIG. 3) may move to be adjacent to each other and may grip the peeled predetermined portion of the second dummy portion DUM2.

Figure 18:
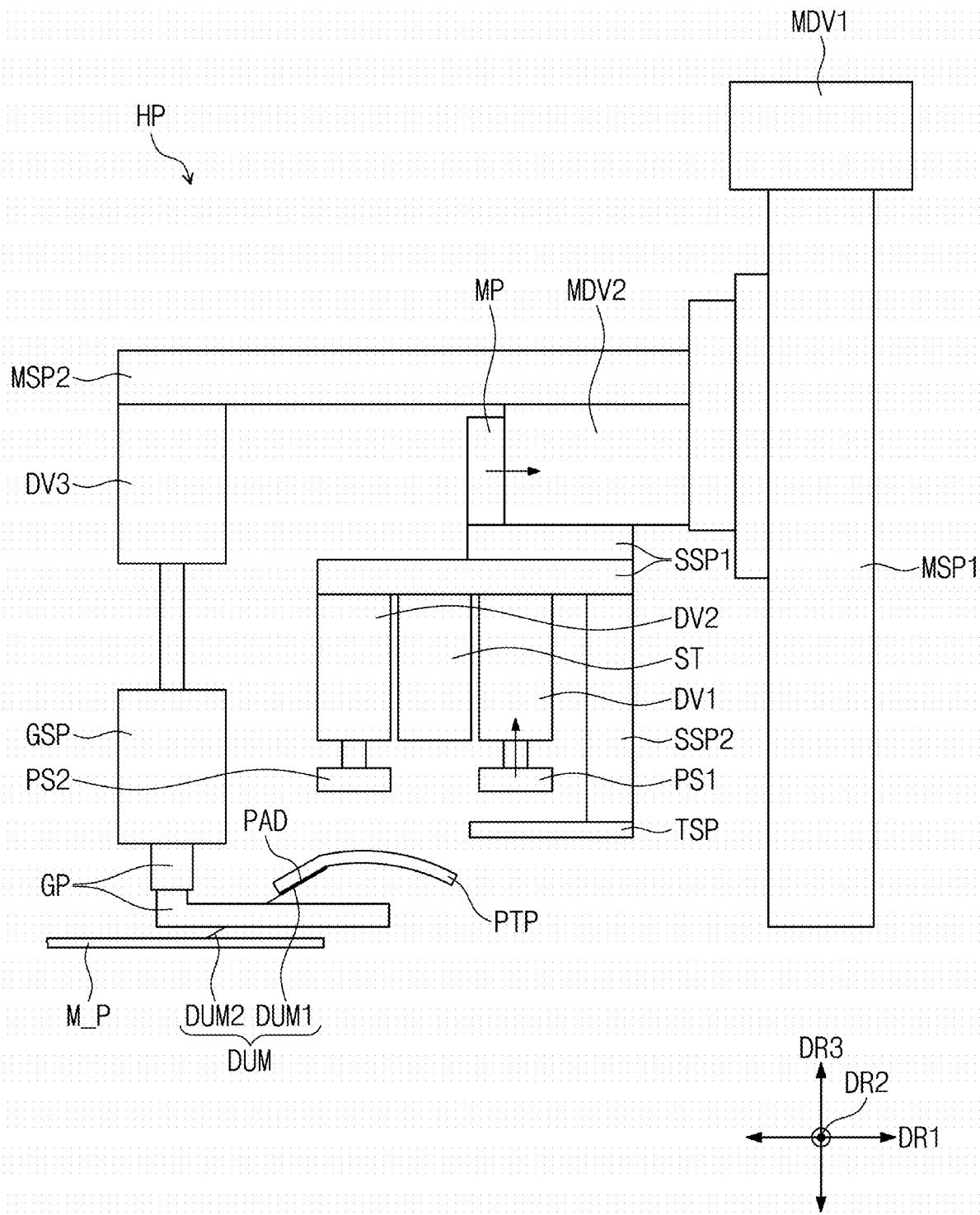

Referring to FIG. 18, when the grip portion GP grips the peeled predetermined portion of the second dummy portion DUM2, the first pressing portion PS1 may move in the upward direction by the first driving portion DV1 so as to be spaced apart from the tape support portion TSP. Thus, the peeling tape PTP may be separated from the tape support portion TSP.

The second main driving portion MDV2 may move the moving portion MP in the right direction to move the first sub-support portion SSP1 connected to the moving portion MP in the right direction. Thus, the first and second pressing portions PS1 and PS2, the suction portion ST and the tape support portion TSP may move away from the grip portion GP by the second main driving portion MDV2.

Figure 19:
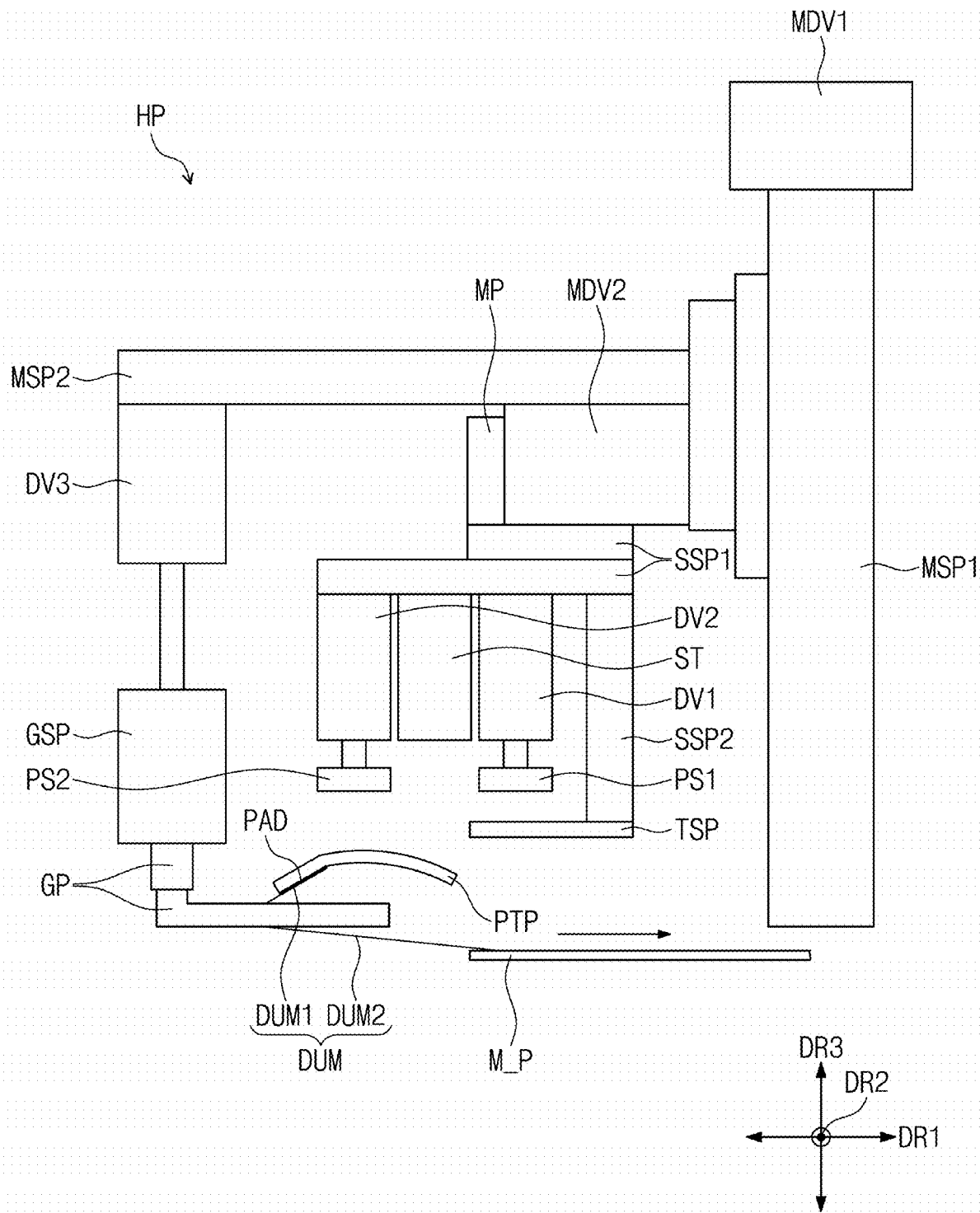

Referring to FIG. 19, after the grip portion GP grips the peeled predetermined portion of the second dummy portion DUM2, the stage STG refer to FIG. 1) may move in the right direction of the first direction DR1 to move away from the grip portion GP. Thus, a remaining portion of the dummy portion DUM may be peeled from the mother panel M_P by the grip portion GP while the mother panel M_P moves.

Figure 20:
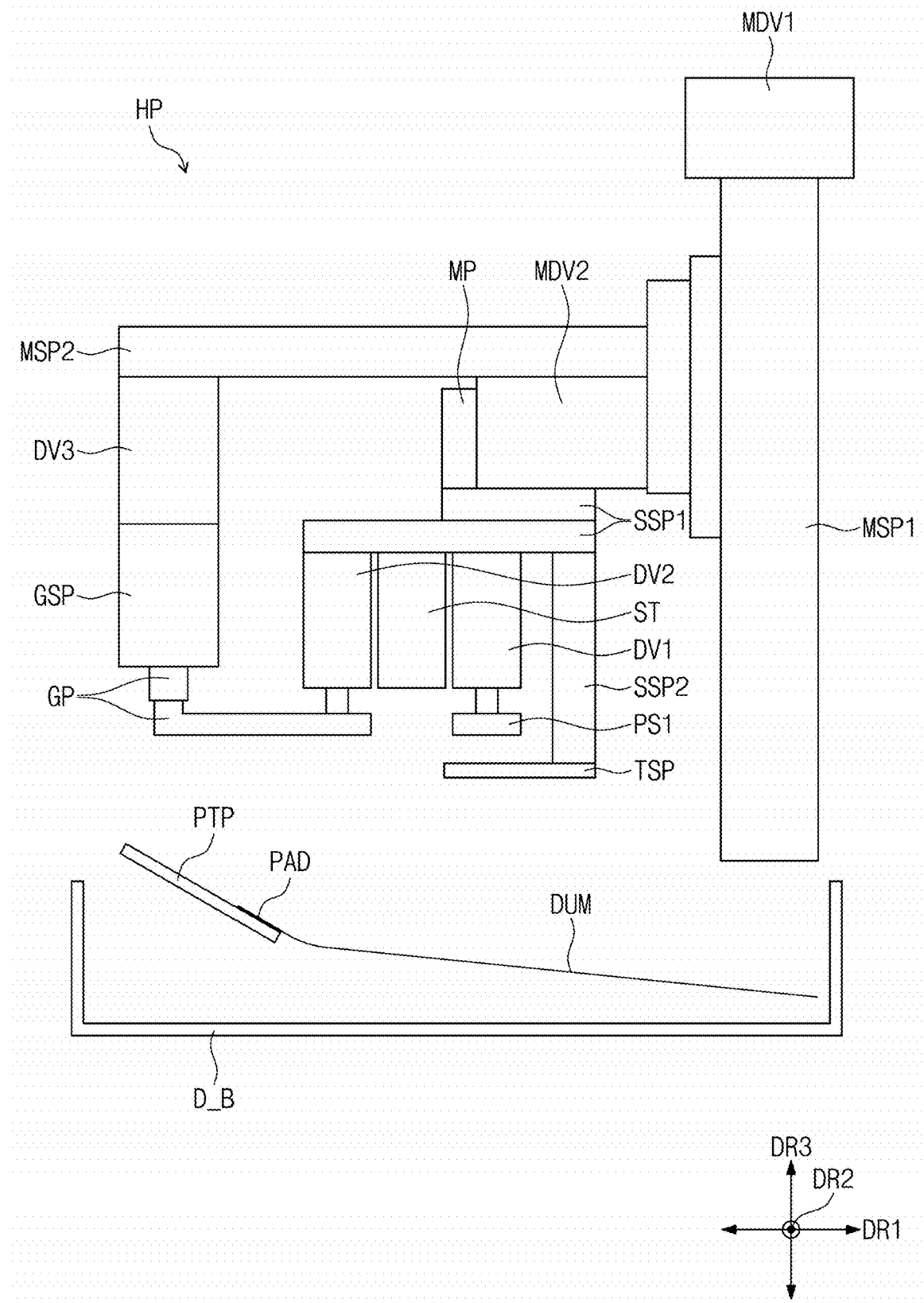

Referring to FIG. 20, the first and second grip portions GP1 and GP2 may move to be spaced apart from each other, and thus the peeling tape PTP and the dummy portion DUM peeled from the mother panel M_P (refer to FIG. 19) may be discarded into a dummy box D_B.

The first adhesive member AD1 may remain on the peeled dummy portion DUM. Since the anti-adhesion coating layers CT are provided on the one side surface of the second sub-grip portion GP1_2 and the one side surface of the fourth sub-grip portion GP2_2, the peeled dummy portion DUM may not be attached to the first and second grip portions GP1 and GP2 even though the first adhesive member AD1 remains on the peeled dummy portion DUM.

Since the one side surface of each of the second and fourth sub-grip portions GP1_2 and GP2_2 has the uneven structure, the peeled dummy portion DUM may not be attached to the first and second grip portions GP1 and GP2. In addition, since the air is jetted through the air jet holes AH of the one side surface of each of the second and fourth sub-grip portions GP1_2 and GP2_2, the peeled dummy portion DUM may be easily detached from the first and second grip portions GP1 and GP2.

After bringing a roller or a pin into contact with the one side of the dummy portion, the dummy portion DUM may be peeled by pushing the dummy portion DUM using the roller or the pin. In this case, the mother panel M_P may be moved on the stage by force of pushing the dummy portion DUM through the roller or the pin, or the panel PN may be lifted from the second protective film PF2 by the pushing force.

However, according to the exemplary embodiments of the invention, the dummy portion DUM may not be pushed, but the head portion HP may attach the peeling tape PTP to the dummy portion DUM and may peel the dummy portion DUM by the peeling tape PTP. Thus, the mother panel M_P may not be pushed from the stage STG, and the panel PN may not be lifted from the second protective film PF2. As a result, the dummy portion DUM may be easily and stably peeled from the mother panel M_P.

Figure 21:
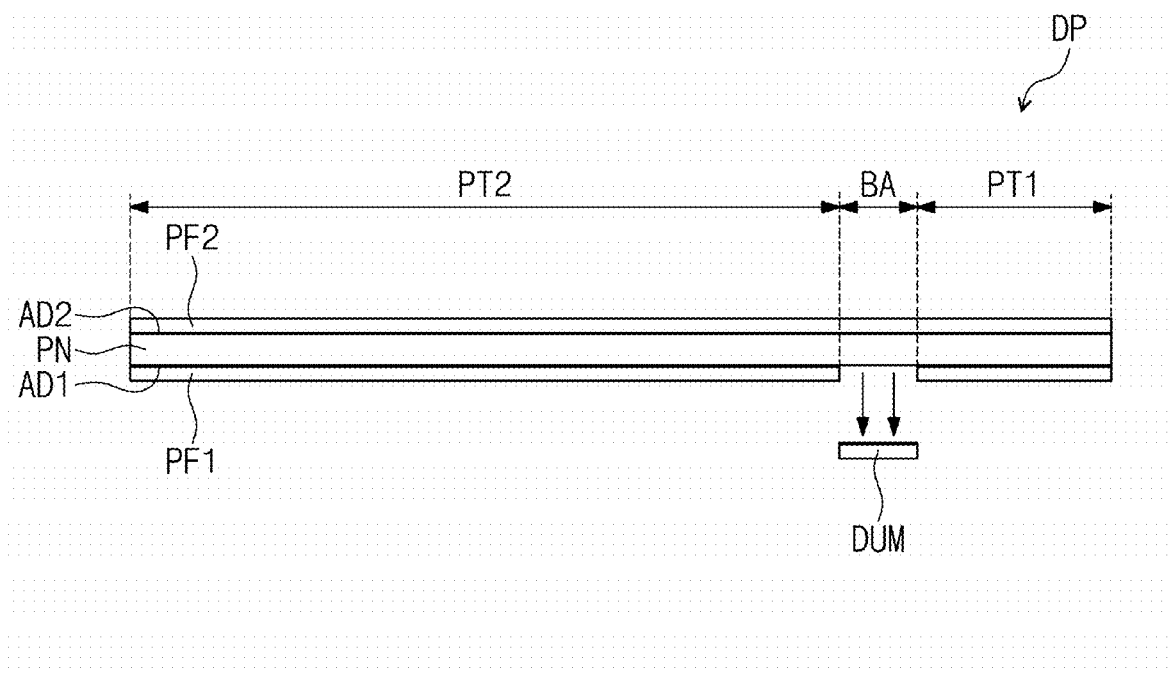
FIGS. 21 and 22 are side views illustrating a unit panel separated from a mother panel.
Figure 22:
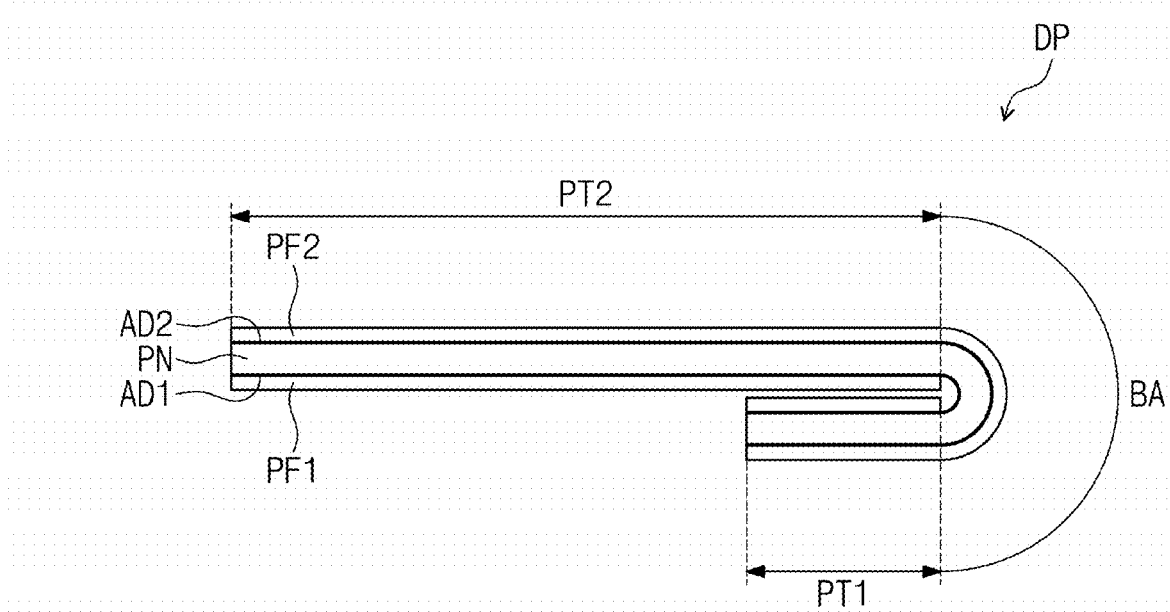

FIGS. 21 and 22 are side views illustrating a unit panel separated from a mother panel.

Referring to FIGS. 21 and 22, the dummy portions DUM may be peeled from the mother panel M_P, and the mother panel M_P may be divided into the unit panels U_P. The unit panel U_P may be defined as a display panel DP. The first protective film PF1 may define a bottom surface of the display panel DP, and the second protective film PF2 may define a top surface of the display panel DP.

The display panel DP may include the bending portion BA and may further include a first portion PT1 and a second portion PT2 disposed with the bending portion BA interposed therebetween. The driving chip IC may be disposed in the first portion PT1, and the second portion PT2 may include a plurality of pixels.

Since the dummy portion DUM of the bending portion BA is peeled, a thickness of the bending portion BA may be smaller than those of the first and second portions PT1 and PT2. Since the bending portion BA has the small thickness, the bending portion BA of the display panel DP may be easily bent. The bending portion BA may be bent, and the first portion PT1 may be disposed under the second portion PT2.

Figure 23:
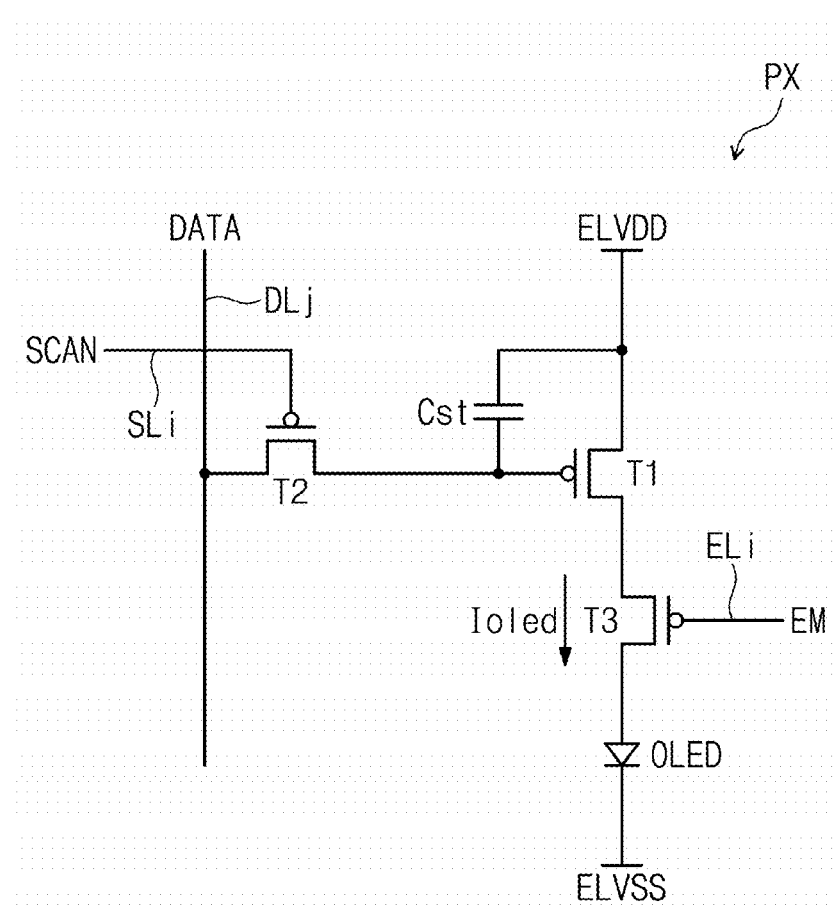
FIG. 23 is an equivalent circuit diagram of a pixel of a second portion.
Figure 24:
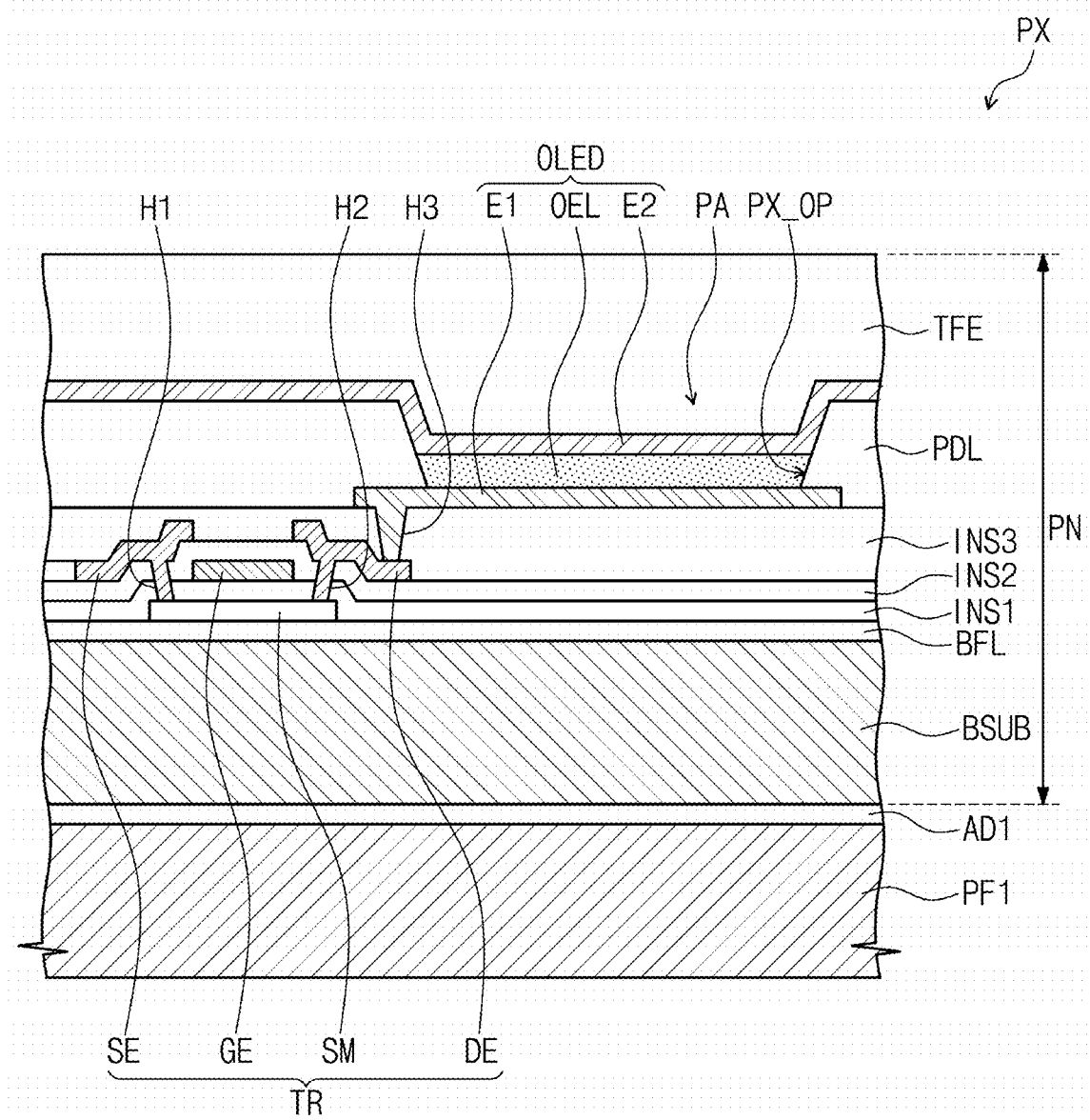
FIG. 24 is a cross-sectional view illustrating the pixel of FIG. 23.

FIG. 23 is an equivalent circuit diagram of a pixel of a second portion. FIG. 24 is a cross-sectional view illustrating the pixel of FIG. 23. One pixel PX is illustrated in FIG. 23. However, other pixels PX may have the same structure or configuration as the pixel PX illustrated in FIG. 23.

Referring to FIG. 23, the pixel PX may be connected to a scan line SLi, a data line DLj, and an emission line ELi. Here, 'i' and 'j' are natural numbers. The pixel PX may include a light emitting element OLED, a driving transistor T1, a capacitive element Cst, a switching transistor T2, and an emission control transistor T3. The light emitting element OLED may be an organic light emitting diode.

A source terminal of the driving transistor T1 may be provided with a first voltage ELVDD, and a drain terminal of the driving transistor T1 may be connected to a source terminal of the emission control transistor T3. A gate terminal of the driving transistor T1 may be connected to a drain terminal of the switching transistor T2.

A gate terminal of the switching transistor T2 may be connected to the scan line SLi, and a source terminal of the switching transistor T2 may be connected to the data line DLj. A first electrode of the capacitive element Cst may be connected to the source terminal of the driving transistor T1, and a second electrode of the capacitive element Cst may be connected to the gate terminal of the driving transistor T1.

A gate terminal of the emission control transistor T3 may be connected to the emission line ELi, and a drain terminal of the emission control transistor T3 may be connected to an anode electrode of the light emitting element OLED. A cathode electrode of the light emitting element OLED may receive a second voltage ELVSS. A level of the second voltage ELVSS may be lower than a level of the first voltage ELVDD.

The switching transistor T2 may be turned-on in response to a scan signal SCAN provided through the scan line SLi.

The turned-on switching transistor T2 may provide a data voltage DATA received through the data line DLj to the gate terminal of the driving transistor T1. The capacitive element Cst may store the data voltage DATA applied to the gate terminal of the driving transistor T1 and may retain the stored data voltage DATA after the switching transistor T2 is turned-off.

The gate terminal of the emission control transistor T3 may receive an emission signal EM through the emission line ELi, and thus the emission control transistor T3 may be turned-on. The turned-on emission control transistor T3 may provide a current Ioled flowing through the driving transistor T1 to the light emitting element OLED. The pixel PX may emit light while the emission signal EM is applied to the emission control transistor T3. An intensity of the light emitted from the light emitting element OLED may be changed depending on the amount of the current Ioled.

In FIG. 23, the transistors T1 to T3 of the pixel PX may be P-type metal-oxide-semiconductor ("PMOS") transistors, for example. However, the invention is not limited thereto. In another exemplary embodiment, the transistors T1 to T3 of the pixel PX may be N-type metal-oxide-semiconductor ("NMOS") transistors, for example. The transistors T1 to T3 of the pixel PX may be defined as driving elements.

Referring to FIG. 24, a pixel PX may include a light emitting element OLED and a transistor TR connected to the light emitting element OLED. The transistor TR may be the emission control transistor T3 of FIG. 23. The transistor TR and the light emitting element OLED may be disposed on a base substrate BSUB.

The first protective film PF1 may be disposed under the base substrate BSUB, and the first adhesive member AD1 may attach the first protective film PF1 to the base substrate BSUB. The second protective film PF2 (refer to FIGS. 21 and 22) is omitted in FIG. 24 for the purpose of ease and convenience in description and illustration.

The base substrate BSUB and the first protective film PF1 may have flexibility and may be transparent. In an exemplary embodiment, the base substrate BSUB may include polyimide ("PI"), and the first protective film PF1 may include polyethylene terephthalate ("PET"), for example.

A buffer layer BFL may be disposed on the base substrate BSUB. The buffer layer BFL may be an inorganic insulating layer including an inorganic material. A semiconductor layer SM of the transistor TR may be disposed on the buffer layer BFL. In an exemplary embodiment, the semiconductor layer SM may include an inorganic semiconductor such as amorphous silicon or poly-silicon or may include an organic semiconductor, for example. In an alternative exemplary embodiment, the semiconductor layer SM may include an oxide semiconductor, for example. Even though not shown in FIG. 24, the semiconductor layer SM may include a source region, a drain region, and a channel region between the source region and the drain region.

A first insulating layer INS1 may be disposed on the buffer layer BFL to cover the semiconductor layer SM. A gate electrode GE of the transistor TR may be disposed on the first insulating layer INS1 and may overlap with the semiconductor layer SM. The gate electrode GE may be disposed to overlap with the channel region of the semiconductor layer SM. A second insulating layer INS2 may be disposed on the first insulating layer INS1 to cover the gate electrode GE. The second insulating layer INS2 may be defined as an inter-insulating layer. The first and second insulating layers INS1 and INS2 may be inorganic insulating layers including an inorganic material.

A source electrode SE and a drain electrode DE of the transistor TR may be spaced apart from each other on the second insulating layer INS2. The source electrode SE may be connected to the source region of the semiconductor layer SM through a first contact hole H1 penetrating the first and second insulating layers INS1 and INS2. The drain electrode DE may be connected to the drain region of the semiconductor layer SM through a second contact hole H2 penetrating the first and second insulating layers INS1 and INS2.

A third insulating layer INS3 may be disposed on the second insulating layer INS2 to cover the source electrode SE and the drain electrode DE of the transistor TR. The third insulating layer INS3 may be defined as a planarization layer providing a flat top surface. The third insulating layer INS3 may be an organic insulating layer including an organic material.

A first electrode E1 of the light emitting element OLED may be disposed on the third insulating layer INS3. The first electrode E1 may be connected to the drain electrode DE of the transistor TR through a third contact hole H3 penetrating the third insulating layer INS3. The first electrode E1 may be defined as a pixel electrode or an anode electrode. The first electrode E1 may include a transparent electrode or a reflective electrode.

A pixel defining layer PDL exposing a predetermined portion of the first electrode E1 may be disposed on the first electrode E1 and the third insulating layer INS3. A pixel opening PX_OP exposing the predetermined portion of the first electrode E1 may be defined in the pixel defining layer PDL. An area in which the pixel opening PX_OP is disposed may be defined as a pixel area PA. An area around the pixel area PA may be defined as a non-pixel area.

An organic light emitting layer OEL may be disposed on the first electrode E1 in the pixel opening PX_OP. The organic light emitting layer OEL may include an organic material capable of generating light having one of a red color, a green color and a blue color, for example. In other words, the organic light emitting layer OEL may generate one of red light, green light and blue light. However, the invention is not limited thereto. In other exemplary embodiments, the organic light emitting layer OEL may generate white light by a combination of organic materials generating red light, green light and blue light, for example.

The organic light emitting layer OEL may include a low-molecular organic material or a high-molecular organic material. Even though not shown in the drawings, in an exemplary embodiment, the organic light emitting layer OEL may include a multi-layer that includes a hole injection layer ("HIL"), a hole transporting layer ("HTL"), a light emitting layer, an electron transporting layer ("ETL"), and an electron injection layer ("EIL"), for example. The HIL may be disposed on the first electrode E1. The HTL, the light emitting layer, the ETL and the EIL may be sequentially stacked on the HIL.

A second electrode E2 of the light emitting element OLED may be disposed on the pixel defining layer PDL and the organic light emitting layer OEL. The second electrode E2 may be defined as a common electrode or a cathode electrode. The second electrode E2 may include a transparent electrode or a reflective electrode. In an exemplary embodiment, when the display panel DP (refer to FIGS. 21 and 22) is a front emission type organic light emitting display panel, for example, the first electrode E1 may be the reflective electrode and the second electrode E2 may be the transparent electrode. In an exemplary embodiment, when the display panel DP is a back emission type organic light emitting display panel, for example, the first electrode E1 may be the transparent electrode and the second electrode E2 may be the reflective electrode.

The light emitting element OLED may be provided in the pixel area PA and may include the first electrode E1, the organic light emitting layer OEL, and the second electrode E2 in the pixel area PA. The first electrode E1 may be an anode corresponding to a hole injection electrode, and the second electrode E2 may be a cathode corresponding to an electron injection electrode. A first power source voltage may be applied to the first electrode E1 and a second power source voltage, a polarity of which is opposite to that of the first power source voltage, may be applied to the second electrode E2. Thus, light may be emitted from the organic light emitting layer OEL of the light emitting element OLED by the transistor TR. A protecting layer TFE may be disposed on the second electrode E2.

Holes and electrons injected in the organic light emitting layer OEL may be combined with each other to generate excitons, and the excitons may transition from an excited state to a ground state to emit light from the light emitting element OLED. The light emitting element OLED may emit one of the red light, the green light and the blue light by a flow of a current to display a piece of image information.

Figure 25:
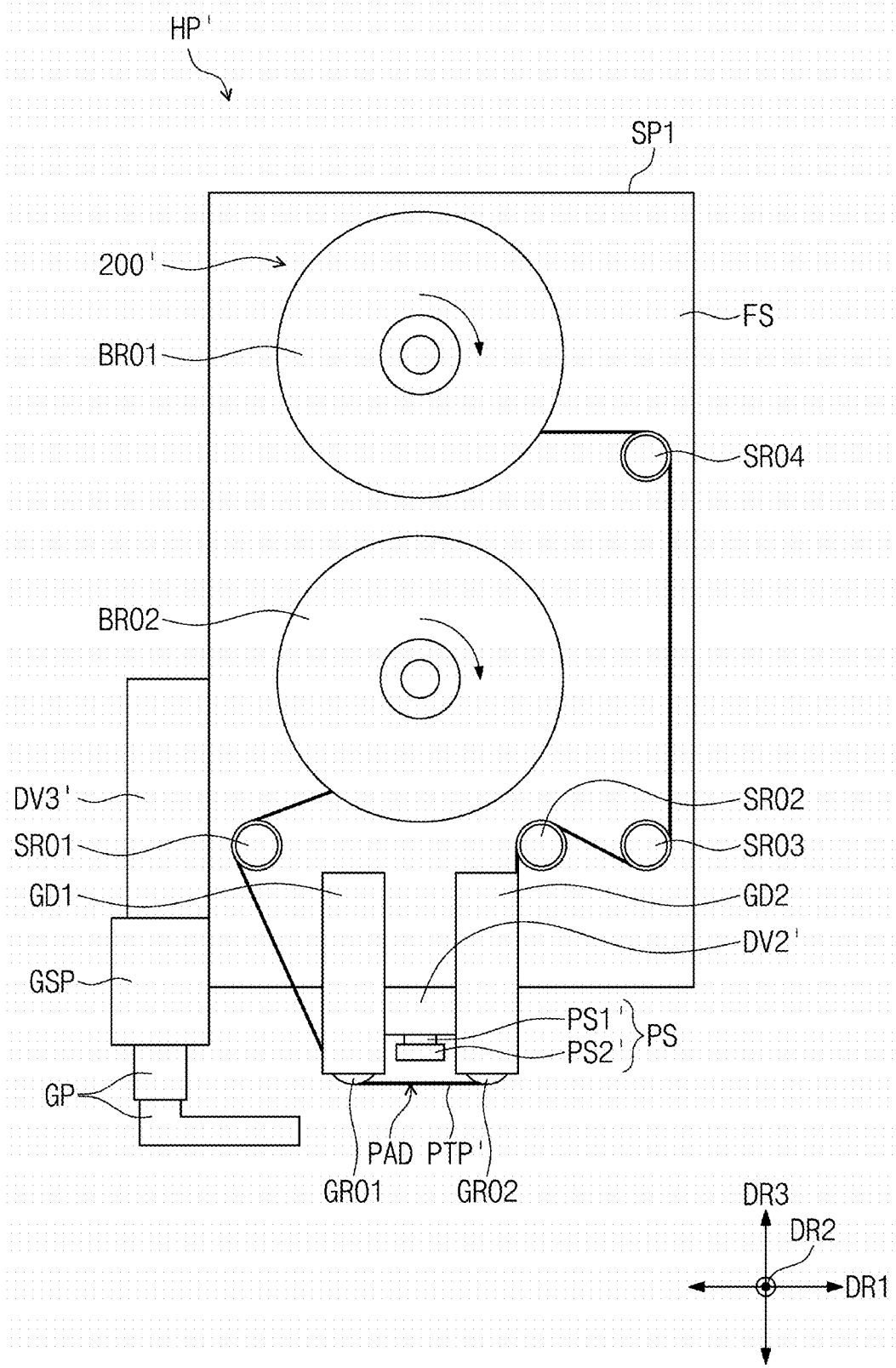
FIGS. 25 and 26 are views illustrating another exemplary embodiment of a head portion of a protective film peeling apparatus according to the invention.
Figure 26:
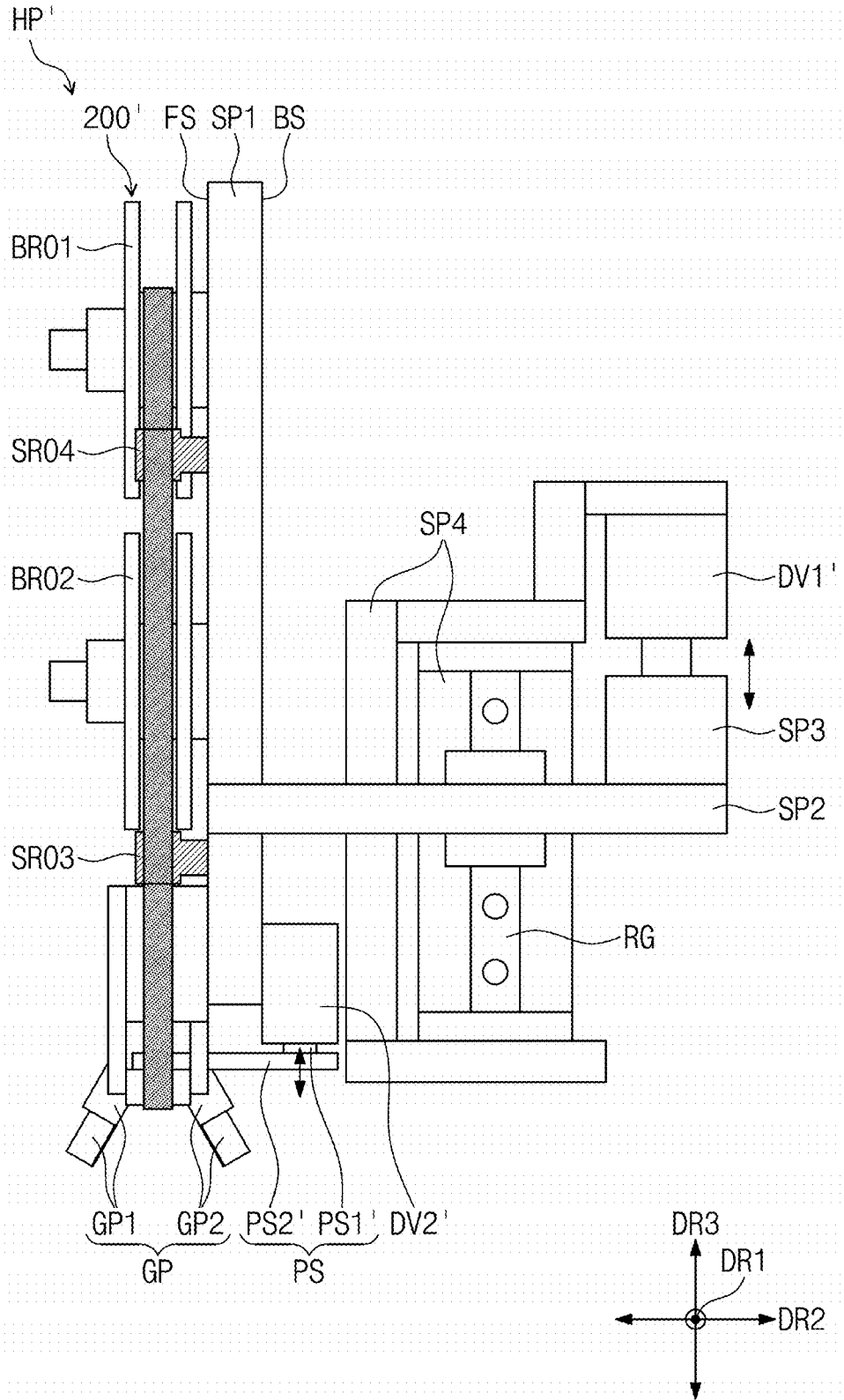

FIGS. 25 and 26 are views illustrating a head portion of a protective film peeling apparatus according to another exemplary embodiment of the invention. FIG. 25 is a view of a head portion HP' when viewed in the second direction DR2, and FIG. 26 is a view of the head portion HP' when viewed in the first direction DR1.

Hereinafter, differences between the head portion HP' of FIGS. 25 and 26 and the head portion HP of FIGS. 2 and 3 will be mainly described, and the same components as in the exemplary embodiment of FIGS. 2 and 3 will be indicated by the same reference designators.

Referring to FIGS. 25 and 26, the head portion HP' may include first, second, third and fourth support portions SP1, SP2, SP3 and SP4, first, second and third driving portions DV1', DV2' and DV3', a grip portion GP, a grip support portion GSP, a pressing portion PS, a peeling tape supply portion 200', first and second guide portions GD1 and GD2, and first and second guide rollers GRO1 and GRO2.

The first support portion SP1 may have a rectangular shape that has long sides parallel to the third direction DR3 and short sides parallel to the first direction DR1. The peeling tape supply portion 200' may be connected to a front surface FS of the first support portion SP1, which is parallel to the first and third directions DR1 and DR3. In the peeling apparatus 1000 illustrated in FIG. 1, the head portion HP is separated from the peeling tape supply portion 200. However, in a peeling apparatus according to the illustrated exemplary embodiment, the peeling tape supply portion 200' is connected to the head portion HP'.

The first and second guide portions GD1 and GD2 may be disposed under the peeling tape supply portion 200' and may be connected to the front surface FS of the first support portion SP1. The first and second guide portions GD1 and GD2 may extend in the third direction DR3 and may be spaced apart from each other in the first direction DR1. Bottom ends of the first and second guide portions GD1 and GD2 may be lower than a bottom end of the first support portion SP1. The first guide roller GRO1 and the second guide roller GRO2 may be disposed at a bottom of the first guide portion GD1 and a bottom of the second guide portion GD2, respectively.

The peeling tape supply portion 200' may provide a peeling tape PTP' to the first guide roller GRO1 and the second guide roller GRO2, and the first and second guide rollers GRO1 and GRO2 may move the peeling tape PTP' in the first direction DR1 while rotating. The peeling tape PTP' may be moved in contact with outer circumferential surfaces of the first and second guide rollers GRO1 and GRO2. The peeling tape PTP' may be returned to the peeling tape supply portion 200' after passing through the second guide roller GRO2.

The peeling tape supply portion 200' may include first and second big rollers BRO1 and BRO2, first, second, third and fourth small rollers SRO1, SRO2, SRO3 and SRO4, and the peeling tape PTP'. The first big roller BRO1 and the second big roller BRO2 may be spaced apart from each other in the third direction DR3 and may be connected to the front surface FS of the first support portion SP1. The second big roller BRO2 may be disposed under the first big roller BRO1. The peeling tape PTP' may extend in the first direction DR1 and may be wound on the first big roller BRO1.

The first, second and third small rollers SRO1, SRO2 and SRO3 may be disposed below the second big roller BRO2 and may be arranged in the first direction DR1. The fourth small roller SRO4 may be disposed adjacent to the first big roller BRO1. A peeling adhesive PAD may be provided on one surface of the peeling tape PTP'.

The first and second big rollers BRO1 and BRO2 and the first to fourth small rollers SRO1 to SRO4 may move the peeling tape PTP' while rotating. In an exemplary embodiment, the peeling tape PTP' wound on the second big roller BRO2 may be provided to the first and second guide rollers GRO1 and GRO2 via the rotating first small roller SRO1, for example.

The rotation of the first and second guide rollers GRO1 and GRO2 may be stopped in a peeling operation of the head portion HP', and the peeling operation may be performed by the peeling tape PTP' disposed between the first and second guide rollers GRO1 and GRO2. The peeling adhesive PAD may be provided on a bottom surface of the peeling tape PTP' disposed between the first and second guide rollers GRO1 and GRO2.

After the peeling operation is completed, the first and second guide rollers GRO1 and GRO2 may be rotated to move the peeling tape PTP', and the peeling tape PTP' may be provided to and wound on the first big roller BRO1 via the second, third and fourth small rollers SRO2, SRO3 and SRO4 which are rotated.

The second support portion SP2 may be connected to a predetermined portion of a back surface BS of the first support portion SP1 opposite to the front surface FS of the first support portion SP1. The second support portion SP2 may extend in the second direction DR2. The third support portion SP3 may be disposed on and connected to an end portion of the second support portion SP2. The third support portion SP3 may be connected to the first driving portion DV1' disposed on the third support portion SP3. The first driving portion DV1' may move the third support portion SP3 in the upward and downward directions along the third direction DR3, and thus the second support portion SP2 connected to the third support portion SP3 and the first support portion SP1 connected to the second support portion SP2 may be moved in the upward and downward directions.

The fourth support portion SP4 may be disposed adjacent to the second support portion SP2 and may extend in the third direction DR3. A rail groove RG extending in the third direction DR3 may be defined in the fourth support portion SP4. The second support portion SP2 may move along the rail groove RG when moving in the upward and downward directions.

The second driving portion DV2' may be disposed at a bottom portion of the first support portion SP1 and may be connected to the back surface BS of the first support portion SP1. The second driving portion DV2' may be disposed below the second support portion SP2. The pressing portion PS may be connected to a bottom of the second driving portion DV2'. The pressing portion PS may be disposed between the first guide portion GD1 and the second guide portion GD2. The pressing portion PS may move in the downward direction to press and attach the peeling tape PTP' to the one side of the dummy portion DUM of the first protective film PF1 disposed on the panel PN.

The pressing portion PS may include a first pressing portion PS1' connected to the bottom of the second driving portion DV2' and a second pressing portion PS2' connected to a bottom of the first pressing portion PS1'. The second pressing portion PS2' may extend in the second direction DR2 so as to be disposed between a lower portion of the first guide portion GD1 and a lower portion of the second guide portion GD2. The second pressing portion PS2' may be disposed on the peeling tape PTP' disposed between the first and second guide rollers GRO1 and GRO2. The second driving portion DV2' may move the first pressing portion PS1' in the upward and downward directions, and thus the second pressing portion PS2' connected to the first pressing portion PS1' may be moved in the upward and downward directions.

The grip support portion GSP may be connected to a bottom of the third driving portion DV3' and may be disposed adjacent to the first and second guide portions GD1 and GD2. The third driving portion DV3' may move the grip support portion GSP in the upward and downward directions to move the grip portion GP in the upward and downward directions. Components of the grip portion GP and the grip support portion GSP may be the same as those of the grip portion GP and the grip support portion GSP illustrated in FIG. 2, and thus the descriptions thereto are omitted.

Since the first driving portion DV1' moves the third support portion SP3 in the upward and downward directions, the first and second support portions SP1 and SP2 may be moved in the upward and downward directions. Thus, the second and third driving portions DV2' and DV3', the first and second guide portions GD1 and GD2, the first and second guide rollers GRO1 and GRO2 and the pressing portion PS may be moved together in the upward and downward directions by the first driving portion DV1'.

At least one head portion HP' illustrated in FIGS. 25 and 26 may be provided in a peeling apparatus to perform the peeling operation.

FIGS. 27 to 30 are views illustrating a method of peeling a protective film using the head portion of FIGS. 25 and 26.

Figure 27:
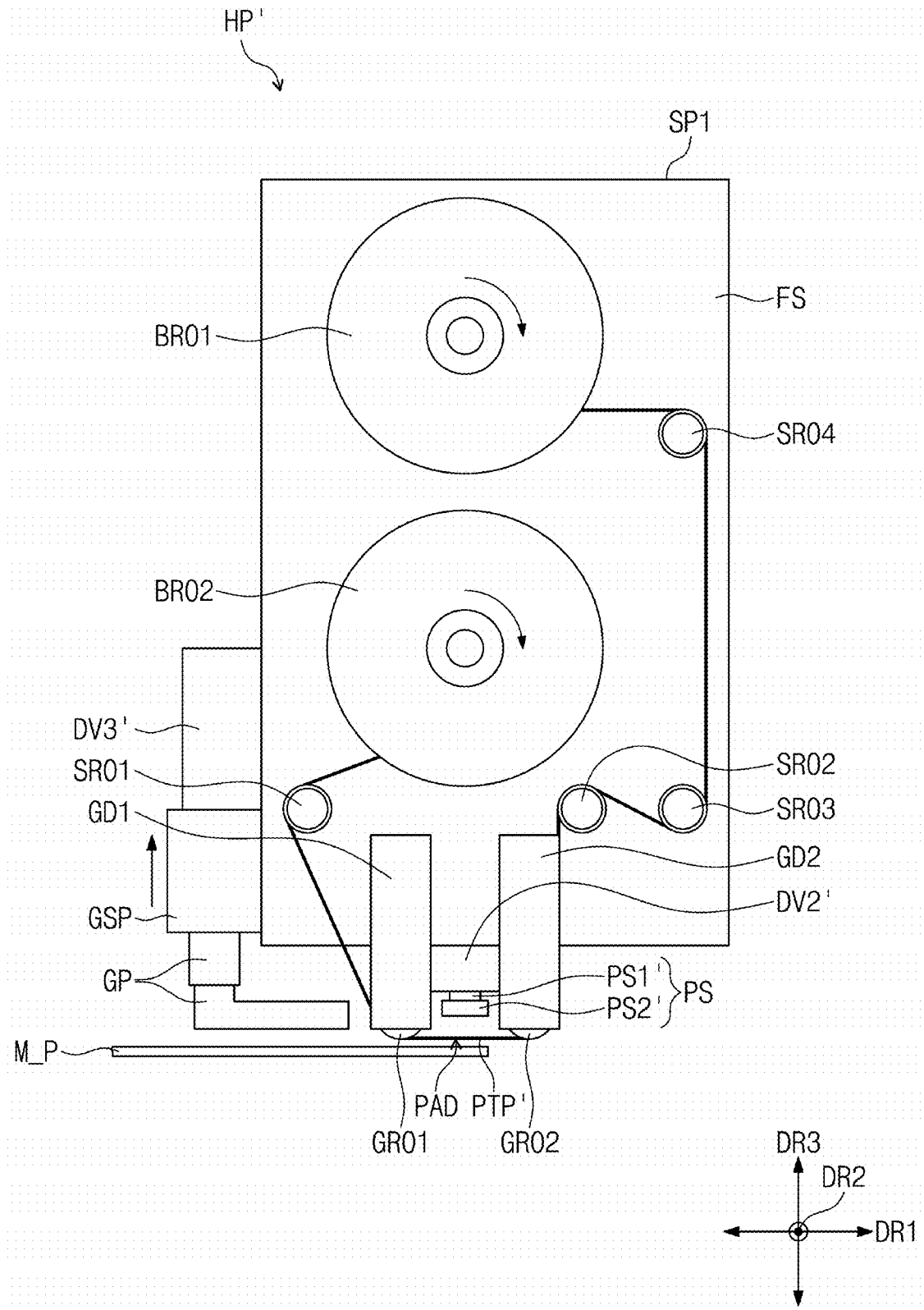
FIGS. 27 to 30 are views illustrating a method of peeling a protective film using the head portion of FIGS. 25 and 26.

Referring to FIG. 27, a mother panel M_P may be moved under the head portion HP' by a stage. The mother panel M_P and the stage may have the same components as the mother panel M_P and the stage STG illustrated in FIGS. 7 to 10.

The rotation of the first and second guide rollers GRO1 and GRO2 may be stopped, and the first dummy portion DUM1 of the mother panel M_P may be disposed to overlap with the peeling tape PTP' disposed between the first and second guide rollers GRO1 and GRO2.

Figure 28:
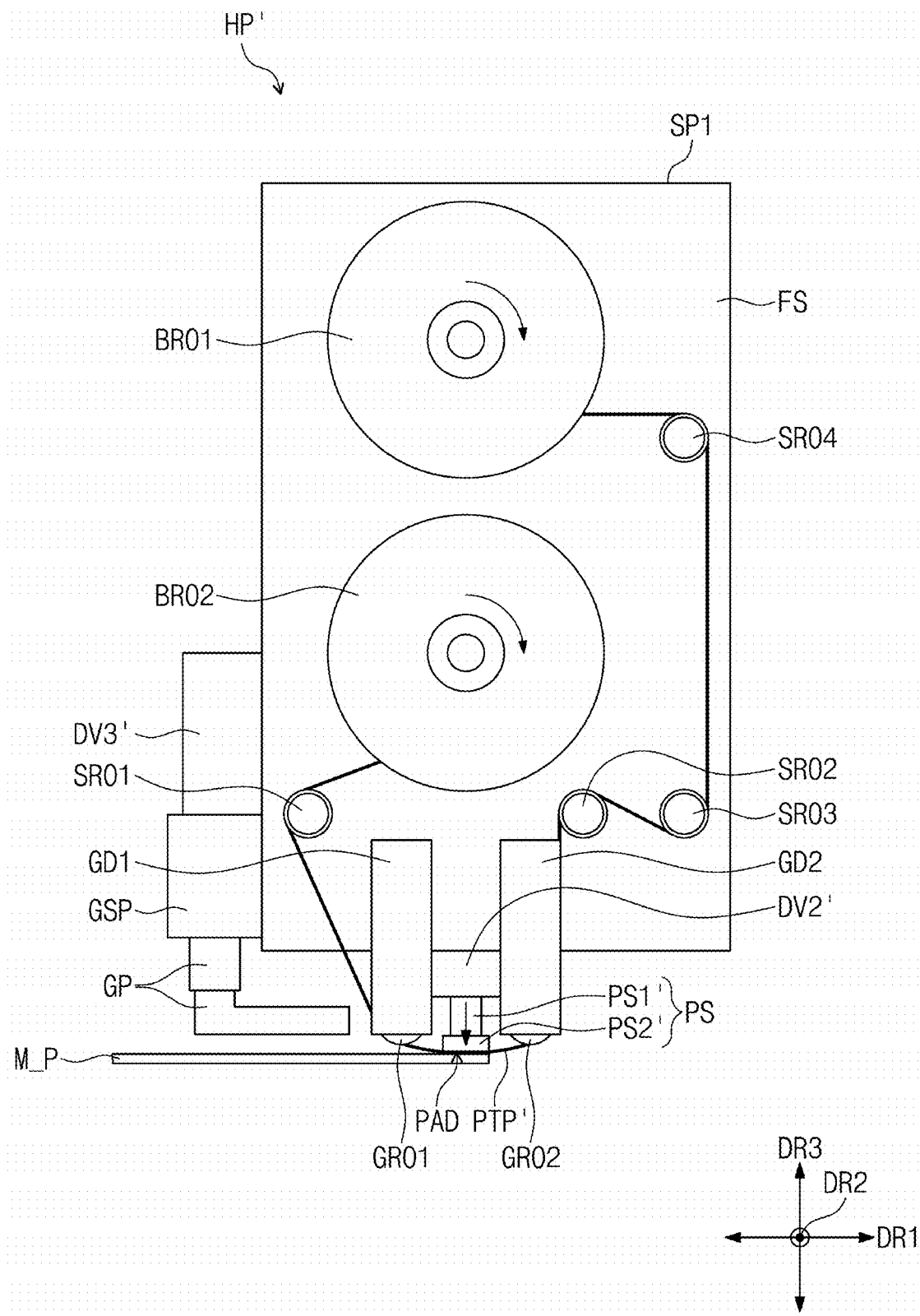

Referring to FIG. 28, the first and second pressing portions PS1' and PS2' may be moved in the downward direction by the second driving portion DV2', and the second pressing portion PS2' may press the peeling tape PTP' between the first and second guide rollers GRO1 and GRO2 to the first dummy portion DUM1 to attach the peeling tape PTP' to the first dummy portion DUM1.

Figure 29:
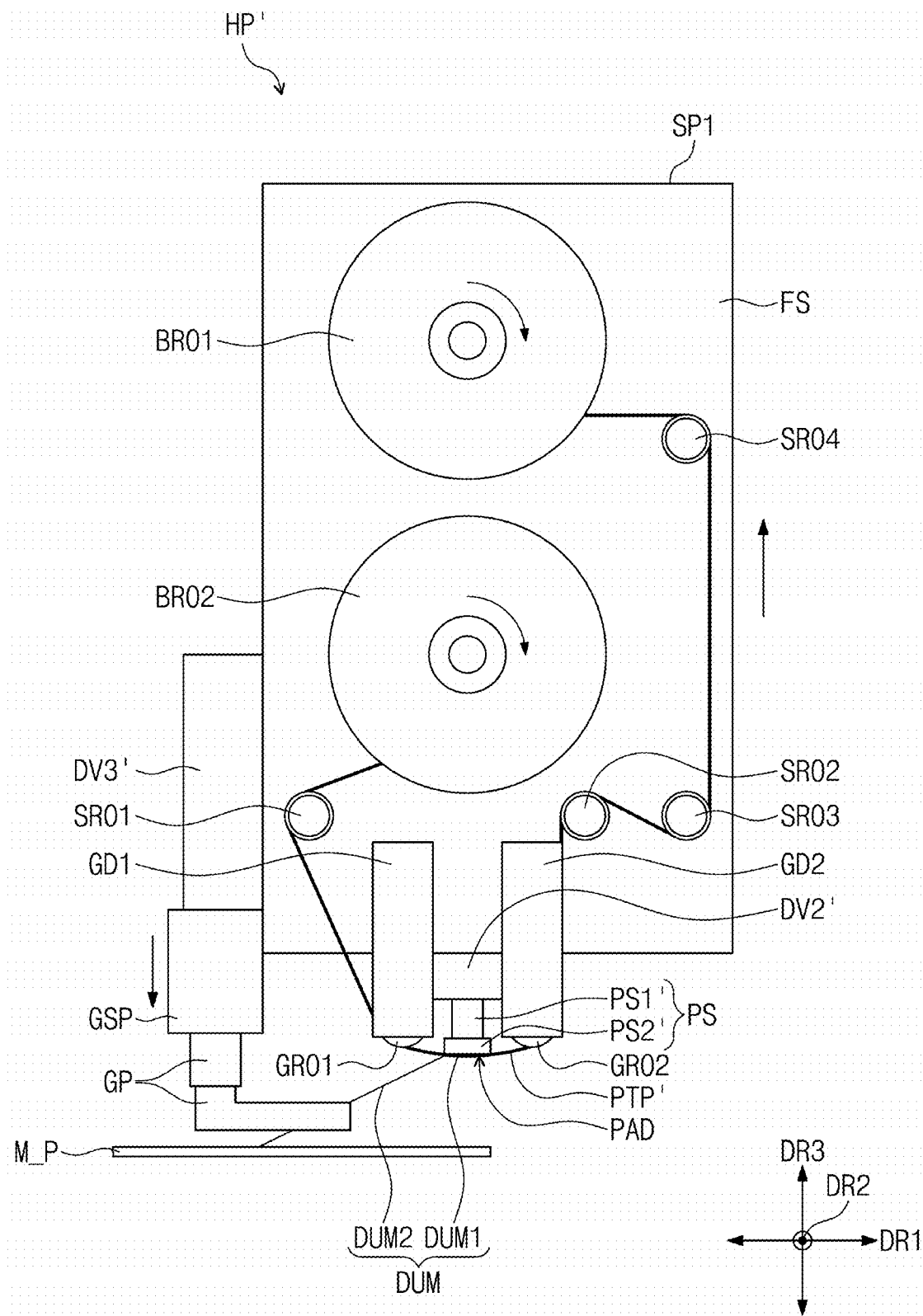

Referring to FIG. 29, the first driving portion DV1' may move the first, second and third support portions SP1, SP2 and SP3 in the upward direction. The first and second guide portions GD1 and GD2, the first and second guide rollers GRO1 and GRO2 and the pressing portion PS may be moved in the upward direction. Thus, the first dummy portion DUM1 attached to the peeling tape PTP' may be peeled from the mother panel M_P, and a predetermined portion of the second dummy portion DUM2 may also be peeled from the mother panel M_P. The grip portion GP may be moved in the downward direction by the third driving portion DV3', and the first and second grip portions GP1 and GP2 may move close to each other to grip the peeled predetermined portion of the second dummy portion DUM2.

Figure 30:
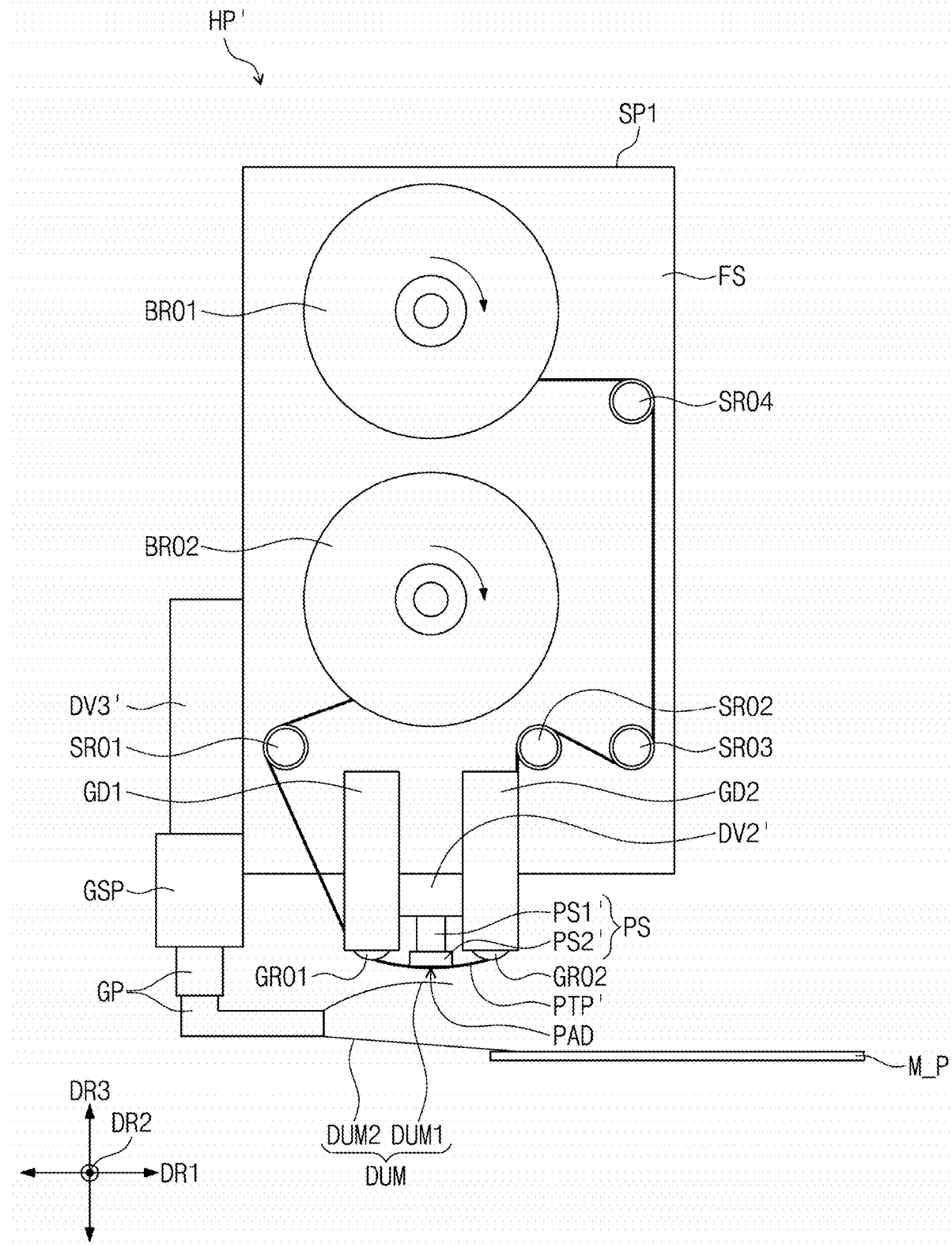

Referring to FIG. 30, after the grip portion GP grips the peeled predetermined portion of the second dummy portion DUM2, the stage may move in the right direction of the first direction DR1 to move away from the grip portion GP. Thus, a remaining portion of the dummy portion DUM may be peeled from the mother panel M_P by the grip portion GP while the mother panel M_P moves.

The first and second guide rollers GRO1 and GRO2 may rotate to move the peeling tape PTP', and thus the dummy portion DUM attached to the peeling tape PTP' may be detached from the peeling tape PTP'. The peeled dummy portion DUM may be discarded into a dummy box. As a result, the peeling apparatus according to the illustrated exemplary embodiment may easily peel the dummy portion DUM.

According to the protective film peeling apparatus and the method of peeling a protective film in the exemplary embodiments of the invention, the peeling tape may be attached to the dummy portion of the protective film provided on the mother panel, and the dummy portion of the protective film may be easily peeled using the peeling tape.

While the invention has been described with reference to exemplary embodiments, it will be apparent to those skilled in the art that various changes and modifications may be made without departing from the spirits and scopes of the invention. Therefore, it should be understood that the above exemplary embodiments are not limiting, but illustrative. Thus, the scopes of the invention are to be determined by the broadest permissible interpretation of the following claims and their equivalents, and shall not be restricted or limited by the foregoing description.

What is claimed is:

1. A method of peeling a protective film, the method comprising:

disposing one side of a peeling tape extending in a first direction on a tape support portion;

moving a first pressing portion disposed on the one side of the peeling tape in a downward direction to press and fix the one side of the peeling tape to the tape support portion;

moving a second pressing portion disposed on another side of the peeling tape in the downward direction to press and attach the another side of the peeling tape to one side of a dummy portion of a protective film of a mother panel;

moving the second pressing portion in an upward direction and moving the tape support portion and the first pressing portion in the upward direction to peel the one side of the dummy portion and a predetermined portion of the dummy portion; and peeling a remaining portion of the dummy portion by gripping the peeled predetermined portion of the dummy portion with a grip portion.

2. The method of claim 1, wherein the peeling the remaining portion of the dummy portion comprises:
moving the grip portion in the downward direction so as to be disposed below the tape support portion;
gripping the peeled predetermined portion of the dummy portion with the grip portion;
moving the first pressing portion in the upward direction to separate the first pressing portion from the one side of the peeling tape; and
moving a stage, on which the mother panel is placed, in the first direction to allow the mother panel to move away from the grip portion.

3. The method of claim 2, further comprising:
pressing the protective film adjacent to the one side of the dummy portion by a fixing portion disposed on one side of the stage adjacent to the one side of the dummy portion.

4. The method of claim 1, wherein the dummy portion comprises:
a first dummy portion defined as the one side of the dummy portion; and
a second dummy portion extending from the first dummy portion in the first direction,
wherein the mother panel comprises:
a panel;
the protective film disposed on the panel; and
an adhesive member disposed between the panel and the protective film to attach the protective film to the panel,
wherein the panel comprises:
a plurality of unit panels arranged in the first direction,
wherein each of the plurality of unit panels comprises:
a bending portion extending in the first direction, and
wherein the second dummy portion overlaps with the bending portion in each of the plurality of unit panels.

5. The method of claim 4, wherein the peeling tape comprises:
a peeling adhesive provided on the another side of the peeling tape to attach the another side of the peeling tape to the first dummy portion,
wherein an adhesive strength of the peeling adhesive is stronger than an adhesive strength of the adhesive member,
wherein a width of the first dummy portion in a second direction intersecting the first direction is greater than a width of the second dummy portion in the second direction, and
wherein a width of the peeling tape in the second direction is equal to or less than the width of the first dummy portion.

6. The method of claim 4, further comprising:
sucking carbonized particles of the adhesive member overlapping with the first dummy portion by a suction portion disposed between the first and second pressing portions when the first dummy portion is peeled.

7. The method of claim 1, wherein the grip portion comprises:

a first grip portion; and
a second grip portion spaced apart from the first grip portion,
wherein the second pressing portion moves in the downward direction and the upward direction between the first grip portion and the second grip portion, and
wherein the first and second grip portions move in the downward direction so as to be disposed below the tape support portion and move close to each other to grip the peeled predetermined portion of the dummy portion, after the predetermined portion of the dummy portion is peeled.

8. The method of claim 7, wherein the first grip portion comprises:
a first sub-grip portion; and
a second sub-grip portion connected to a bottom of the first sub-grip portion and having an L-shape when viewed in a second direction intersecting the first direction,
wherein the second grip portion comprises:
a third sub-grip portion; and
a fourth sub-grip portion connected to a bottom of the third sub-grip portion and having an L-shape when viewed in the second direction,
wherein the second and fourth sub-grip portions move close to each other to grip the peeled predetermined portion of the dummy portion.

9. The method of claim 8, wherein the grip portion further comprises:
anti-adhesion coating layers respectively provided on one side surface of the second sub-grip portion and one side surface of the fourth sub-grip portion which face each other; and
a plurality of air jet holes provided at the one side surface of the second sub-grip portion and the one side surface of the fourth sub-grip portion,
wherein the one side surface of the second sub-grip portion and the one side surface of the fourth sub-grip portion have uneven structures.

10. A method of peeling a protective film, the method comprising:
providing a peeling tape extending in a first direction to a first guide roller and a second guide roller which rotate;
stopping the rotation of the first and second guide rollers and moving a pressing portion in a downward direction to press and attach the peeling tape between the first and second guide rollers to one side of a dummy portion of a protective film on a panel;
moving the first and second guide rollers and the pressing portion in an upward direction to peel the one side of the dummy portion and a predetermined portion of the dummy portion; and
moving a grip portion in the downward direction and gripping the peeled predetermined portion of the dummy portion with the grip portion to peel a remaining portion of the dummy portion.

* * * * *